(12) United States Patent
Yang et al.

(10) Patent No.: US 12,710,316 B2
(45) Date of Patent: Aug. 18, 2026

(54) HOTSPOT MONITORING SYSTEM FOR SUPERCONDUCTING DEVICE

(71) Applicant: ECOLE POLYTECHNIQUE FEDERALE DE LAUSANNE (EPFL), Lausanne (CH)

(72) Inventors: Zhisheng Yang, Lausanne (CH); Arooj Akbar, Renens (CH)

(73) Assignee: ECOLE POLYTECHNIQUE FEDERALE DE LAUSANNE (EPFL), Lausanne (CH)

(*) Notice: Subject to any disclaimer, the term of this patent is extended or adjusted under 35 U.S.C. 154(b) by 1118 days.

(21) Appl. No.: 17/638,135

(22) PCT Filed: Aug. 28, 2020

(86) PCT No.: PCT/IB2020/058039
§ 371 (c)(1),
(2) Date: Feb. 24, 2022

(87) PCT Pub. No.: WO2021/038505
PCT Pub. Date: Mar. 4, 2021

(65) Prior Publication Data

US 2022/0291049 A1 Sep. 15, 2022

(30) Foreign Application Priority Data

Aug. 29, 2019 (WO) .................. PCT/IB2019/057271

(51) Int. Cl.

| | |
|---|---|
| ***G01J 5/48*** | (2022.01) |
| ***G01J 5/58*** | (2022.01) |
| ***G01K 3/14*** | (2006.01) |

(52) U.S. Cl.
CPC . *G01J 5/48* (2013.01); *G01J 5/58* (2013.01); *G01J 2005/583* (2013.01); *G01K 2003/145* (2013.01)

(58) Field of Classification Search
CPC .......... G01J 5/48; G01J 5/58; G01J 2005/583; G01K 2003/145; H10N 60/203;
(Continued)

(56) References Cited

U.S. PATENT DOCUMENTS

2008/0193126 A1* 8/2008 Yamamoto ........... G01M 11/319
374/E11.015
2017/0179364 A1* 6/2017 Schwartz ............... H10N 60/80

FOREIGN PATENT DOCUMENTS

CN 109814048 5/2019
JP 7-167930 7/1995
(Continued)

OTHER PUBLICATIONS

Akbar, A., et al., "Fast Hotspot Detection in SFCLs by Exploiting Strain Response in Optical Fiber Sensing", IEEE Transactions on Applied Superconductivity, vol. 31, No. 5, Aug. 2021, 5 pages.
(Continued)

*Primary Examiner* — John E Breene
*Assistant Examiner* — Janice M Soto
(74) *Attorney, Agent, or Firm* — Nixon & Vanderhye, PC

(57) ABSTRACT

Hotspot monitoring system for superconducting devices including: —a superconductor; —a first optical waveguide attached to the superconductor for providing a first optical signal; —a second optical waveguide for providing a reference signal; and —interference means configured to overlay or superimpose the first optical signal and the reference optical signal to produce an optical interference signal.

20 Claims, 12 Drawing Sheets

(58) Field of Classification Search
CPC .... H10N 60/30; G01R 33/3815; Y02E 40/60; G01D 5/35374; G01D 5/35329
See application file for complete search history.

(56) References Cited

FOREIGN PATENT DOCUMENTS

| | | | |
|---|---|---|---|
| JP | H07167930 A | * | 7/1995 |
| JP | 2015153487 A | * | 8/2015 |

OTHER PUBLICATIONS

Akbar, Arooj, et al., "Optical fibre sensing for fast hotspot detection in SFCLs", Superconductor Science and Technology, vol. 33, No. 11, Sep. 2020, 7 pages.
Akbar, Arooj, et al., "Optical fibre based quench detection in HTS applications using machine learning classifiers", Physica C: Superconductivity and its applications, vol. 593, 2022, 8 pages.
Chiuchiolo, A., et al., "Fiber Bragg Grating Cryosensors for Superconducting Accelerator Magnets", IEEE Photonics Society, vol. 6, No. 6, Dec. 2014, 10 pages.
Debnath, Suman, et al., "Control of MMC-HVDC in Low-Inertia Weak Grids", IEEE 12th International Conference on Power Electronics and Drive Systems (PEDS), Dec. 2017, pp. 435-441.
Kersey, Alan D., et al., "Fiber Grating Sensors", Journal of Lightwave Technology, vol. 15, No. 8, Aug. 1997, pp. 1442-1463.
Lacroix, Christian, et al., "Normal Zone Propagation Velocity in 2G HTS Coasted Conductor With High Interfacial Resistance", IEEE Transactions on Applied Superconductivity, vol. 23, No. 3, Jun. 2013, 5 pages.
Leon Garcia, William Ricardo, et al., "Technical and Economic Analysis of the R-Type SFCL for HVDC Grids Protection", IEEE Transactions on Applied Superconductivity, vol. 27, No. 7, Oct. 2017, 9 pages.
Mourinho, Fabricio A., et al., "Modeling and Analysis of Superconducting Fault Current Limiters Applied in VSC-HVDC Systems", IEEE Power Energy Society General Meeting, Jul. 2015, 5 pages.
Noe, Mathias, et al., "Conceptual Design of a 24 kV, 1 kA Resistive Superconducting Fault Current Limiter", IEEE Transactions on Applied Superconductivity, vol. 22, No. 3, Jun. 2012, 4 pages.
Rajini-Kumar, R., et al., "Performance evaluation of metal-coated fiber Bragg grating sensors for sensing cryogenic temperature", Cryogenics, vol. 48, No. 3/4, Mar./Apr. 2008, pp. 142-147.
Scurti, F., et al., "Quench detection for high temperature superconductor magnets: a novel technique based on Rayleigh-backscattering interrogated optical fibers", Superconductor Science and Technology, vol. 29, No. 3, 2016, 8 pages.
Scurti, Federico, et al., "Effects of metallic coatings on the thermal sensitivity of optical fiber sensors at cryogenic temperatures", Optical Materials Express, vol. 7, No. 6, Jun. 1, 2017, 13 pages.
Scurti, Federico, et al., "Optical fiber distributed sensing for high temperature superconductor magnets", 25th International Conference on Optical Fiber Sensors, Proceedings of SPIE, vol. 10323, 2017, 4 pages.
Spahic, E., et al., "A closer look at protection concepts for DC systems", CIGRE 2016, Paper B4-118, 10 pages.
Tixador, P., et al., "Some Results of the EU Project Fastgrid", IEEE Transactions on Applied Superconductivity, vol. 32, No. 4, Jun. 2022, 6 pages.
Tixador, Pascal, et al., "Status of the European Union Project Fastgrid", IEEE Transactions on Applied Superconductivity, vol. 29, Issue 5, Aug. 2019, 5 pages.
Arooj Akbar, et al., "Optical fibre sensing for fast hotspot detection in SFCLs", Superconductor Science and Technology, IOP Publishing, vol. 33, No. 11, Sep. 21, 2020, 7 pages.
International Search Report for PCT/IB2020/058039 dated Dec. 14, 2020, 4 pages.
Written Opinion of the ISA for PCT/IB2020/058039 dated Dec. 14, 2020, 5 pages.

* cited by examiner

FCL
Voltage Source
Current
Clear Fault
$I_C$
$I_N$
Time $I_c/I_{cmean}$
1,2
1
0,8
0,6
0,4
0,2
0
20
40
60
80
100
Z (mm)
$I_{C\_max}$
$I_{C\_min}$
A

*Optical fiber sensing:*

- Fibers are small and can be seamlessly integrated in a structure and the environment
- Fibers are chemically inert and electrically insulating
- Fibers are extremely transparent (50% light remaining after 15km) → Negligible heating
- Fibers do not distort signals (1 THz over 1000km)

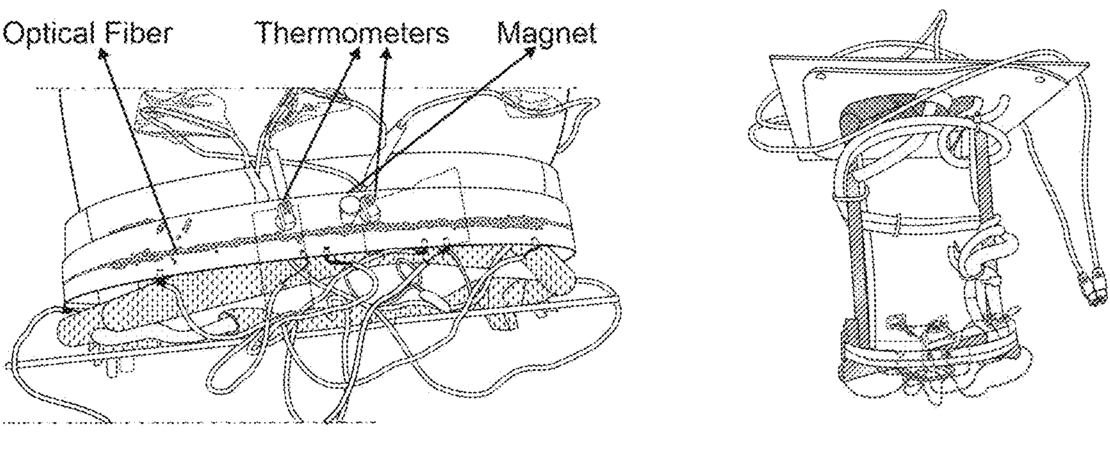
Figure 10A
Figure 10B
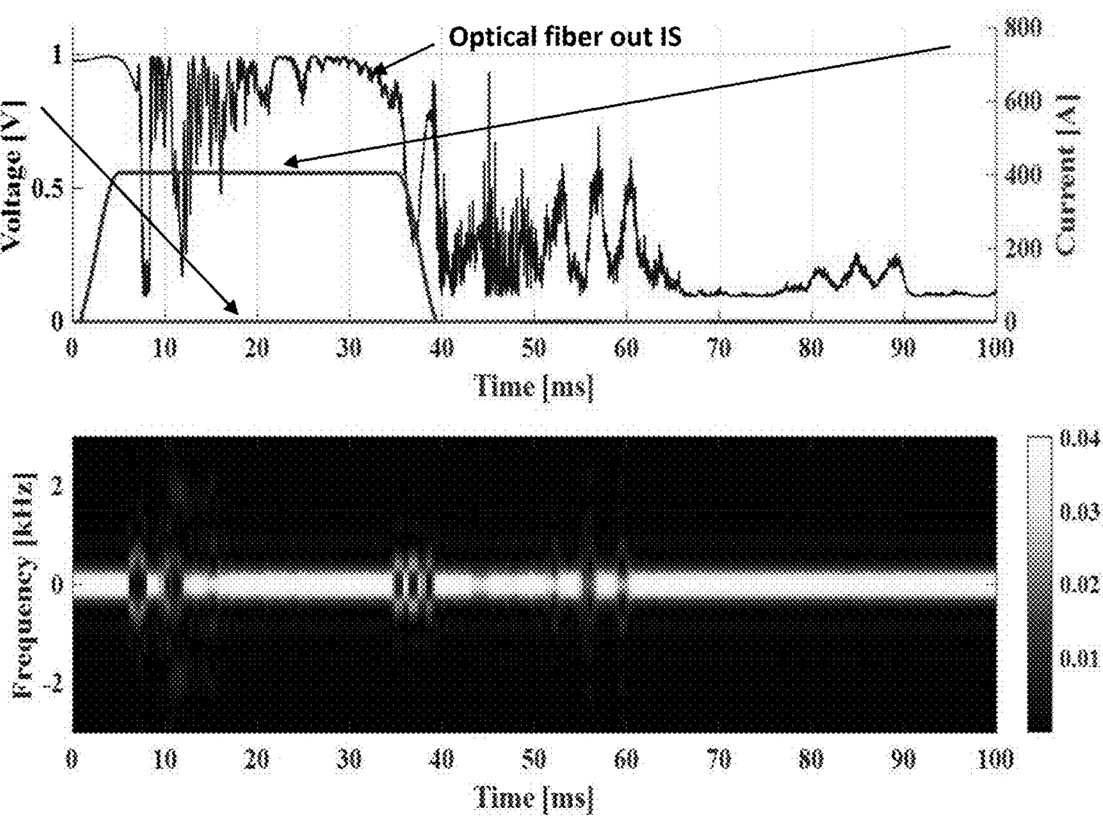
Figure 11A

HOTSPOT MONITORING SYSTEM FOR SUPERCONDUCTING DEVICE

CROSS-REFERENCE TO RELATED APPLICATIONS

This application is the U.S. national phase of International Application No. PCT/IB2020/058039 filed Aug. 28, 2020 which designated the U.S. and claims priority to International Patent Application No. PCT/IB2019/057271 filed Aug. 29, 2019, the entire contents of each of which are hereby incorporated by reference.

FIELD OF THE INVENTION

The present disclosure relates to a superconductor device or system, or a superconductor monitoring device or a superconductor protecting/protection device, or a hotspot monitoring system/device for a superconducting device. The hotspot monitoring system is configured to or can be used in the determination of a presence of a single or at least one hotspot or heating point in the superconductor allowing the hotspot monitoring system to be used in or as part of a larger system or device to detect events in such larger systems for which a further action or intervention may be necessary, for example, a partial or full shutdown or isolation of the larger system to prevent or minimize a potentially damaging event for the system. The present disclosure also concerns a method for determining the presence of a single or at least one hotspot or heating point in a superconductor.

BACKGROUND

The present disclosure provides an extremely fast and economical way to protect superconductors making superconductors extremely exploitable in grids (or power transmission networks) and industrial applications like HTS cables, Fault Current Limiters (FCLs), motors and generators, MRI in the medical sector and other high field magnet applications. Superconductors can degrade in the presence of currents higher than the critical current value at which the superconductor quenches; a quench (or hotspot) is the transition from superconducting to resistive state. Since the quench can be non-uniform due to varying critical current values along the superconductor length, the superconductor can have localized heating called hotspots leading to thermal runaways in the device.

The technique of the present disclosure can enable an economical way to protect and monitor the health of superconductors in industrial applications allowing a largescale use of HTS applications. It is extremely feasible in terms of efficiency, cost and simplicity. The response is rapid which makes it ideal for applications requiring swift decision making.

Superconductors are an attractive solution to protect grids and to enhance their efficiency, particularly high-voltage direct current HVDC grids. High Temperature Superconductor (HTS) Fault Current Limiters (FCL), Cables and other power devices can withstand very high current levels, however, the prevention of superconductor degradation by local heating is a challenge that must be overcome to permit their potential to be exploited in industry.

Superconductors limit fault currents by their quick transition (at critical current) from superconducting to resistive state allowing immediate fault limitation by transition from superconducting to normal state. This transition is called a quench. Fault currents cause the superconducting tape to quench at critical current value, however, due to the non-homogenous critical current along the superconductor length the quench is not uniform. Moreover, the low thermal conductivity causes the quench to spread through the tape with a very low rate (low Normal Zone Propagation Velocity NZPV) causing localized heating called hotspots that can cause destruction in the superconductor.

The technique of the present disclosure is an innovative way to protect the superconductor by detecting even singular hotspots and raising an alarm very quickly, for example, within 10 ms. It is a significant breakthrough capable of fast detection of even singular hotspots using optical waveguide/fiber sensing. This provides a way to make superconducting devices extremely usable not only for grid operation but also other HTS applications in industry.

The present technique can enable, for example, the usage of Superconducting Fault Current Limiters (SFCLs) in the grid by providing an efficient way to monitor the superconductor health and raising the alarm with absolute certainty to open a DC breaker to protect the device. For now, grids use a current threshold to aid their decision-making process of opening a breaker to protect grid elements; this is an extremely inefficient and non-selective way to deal with high currents as the DC breakers are opened even when there is no fault. SFCLs are an effective way to protect grids especially HVDC grids. Protecting HVDC grids is a big challenge because of the difficulty presented by the lack of zero crossings in DC currents. For AC grids protection mechanisms like air coils (FIG. 4), inductors and hybrid breakers exist. While these mechanisms can be used on the AC side for hybrid AC-DC grids, they become void in the case of a pure meshwork of HVDC lines. With the rise of renewable energies and the much higher efficiency of HVDC transmission of energy over longer distances the current grid will evolve into a meshed HVDC grid with an urgent need for good grid health monitoring and protection techniques.

The technique of the present disclosure is also useful for modern HTS cables to detect hotspots at high current levels. Installing optical waveguide/fiber along the length of the cable conductor according to the present disclosure is a game changing way of monitoring HTS cable health and operating HTS cables. The technique can be used in superconducting cables to offer protection and limitation against high currents. The technique, therefore, can enable easier and safer operation of modern HTS cables and encourage increased HTS cable installations in the grid.

With this technique, one can prevent thermal runaways in superconducting devices in a selective and efficient manner enabling their use in a wide range of HIS power applications and others.

As mentioned, the energy distribution grid is evolving as renewable energy generation is gradually taking more of a forefront in energy contribution. At present, HVDC links connect offshore renewable energy generation to the distribution grid; with increasing renewable energy generation the grid will gradually transform into a meshed HVDC grid. The protection mechanisms that work for AC grids will not be suited to address the protection of a low inertia meshed HVDC grid where the current lacks zero crossings and fault currents can reach extremely high values within 10 ms [1-2]. Several studies have shown that resistive Superconductive Fault Current Limiters (SFCLs) are promising candidates to provide selective protection for HVDC grids with their swift transition to resistive state in the presence of high currents [3-4]. The high cost of SFCLs is one of the major impediment in employing this solution.

The calculations for Eccoflow conductor with a limitation electric field of 50 V/m (50 ms) showed prohibitive costs of 200 €/kA/m [5]. The European Union project FastGrid aims at improving the REBCO tape architecture by increasing the limitation electric field with the overall goal of making a low length economically feasible SFCL device [6]. The optimized REBCO conductor will be used to make a high voltage DC SFCL module (≈1.5 kA-50 kV) operated at 67 K. The module will be equipped with an optical waveguide/fiber sensing based health monitoring system to detect hotspots, which is presented in this disclosure.

While emphasis is placed on a DC device for HVDC grids in this disclosure, it should be noted, however, that this is a non-limiting application of the innovation of the present disclosure and the hotspot detection technique for SFCLs outlined in this disclosure can be employed in many different HIS applications and power devices.

Like all superconducting systems, SFCLs need to be protected from their primary source of failure: hotspots. Hotspots are a consequence of the inherent material inhomogeneity present in coated high temperature superconductors (HIS) which are used in SFCLs. This material inhomogeneity produces an upper and lower bound on the local critical current ($I_c$) along the HIS tape. This critical current, therefore, can be understood to lie in a band ranging from minimum critical current value ($I_{c\_min}$) to the maximum critical current value ($I_{c\_max}$), with different points along the superconductor transitioning to resistive state at different critical current values.

Under normal SFCL operation, the operating current level is below the minimum $I_c$ i.e., ($I_0<I_{c\_min}$), so that the entire superconductor is in superconducting state and features zero resistance. However, when a clear fault current develops, i.e., the rated current is beyond the highest $I_c$ ($I_0>I_{c\_max}$), the superconductor transitions uniformly from superconducting state to resistive state; this sharp increase in resistance restricts fault currents and allows for further protective actions to be taken, such as opening the associated circuit breaker or diverting the current to a parallel circuit path with the desired higher impedance.

The problem of hotspots, however, can occur when the operating current level is in between the bounds $I_{c\_min}$ and $I_{c\_max}$, so that only few points or even a singular point in the superconductor may transition to resistive state. Such local transitions propagate by means of joule heating created by the initial normal zone with a extremely slow normal zone propagation velocity (NZPV) [7]. This puts HTS applications at a risk of high localized temperatures and irreversible material degradation in the event of a hotspot.

In other words, in presence of high currents, the SFCLs transition from superconducting to resistive state limiting the fault current. While the device is theoretically a good way to protect grids, its inherent inhomogeneity of critical current along conductor length makes SFCL device protection a problem. The critical current for a superconductor is the current at which the superconductor transitions from superconducting to resistive state (a quench). This critical current is non-uniform along the conductor length meaning different points in the conductor length will transition (quench) at different critical current values. This is shown in FIG. 2 which shows critical current along the conductor length. The critical current lies not at one value (as schematically shown in FIG. 1) but in a band (as schematically shown in FIGS. 2 to 4), as mentioned above.

Consequently, if the critical current is significantly above the $I_{c\_max}$ value then all the points in the superconductor quench give a clear fault leading to a uniform transition to the resistive state. However, when the critical current is at $I_{c\_min}$ for example, only one point in the superconductor will quench, which is labelled as A in FIG. 2. Only a single or few points quenching in the conductor will lead to localized heating and ultimately destruction of the superconductor and in this context, the SFCL device.

To use SFCLs in the grid, currently a DC breaker (as shown schematically in FIGS. 1 and 3) is included in line with each SFCL device and a nominal current value $I_N$ is defined. If the current increases beyond this nominal current value $I_N$, the circuit breaker is opened even though it is not certain if the SFCL device is in danger of being damaged. This method to protect the SFCL is extremely inefficient leading to unnecessary shutdown of the grid even when there is no fault current. Using current as the parameter to deal with nominal current fluctuation is an inefficient way leading to frequent opening of the DC breaker. It is also more difficult to predict whether there is a true fault using this method. In a SFCL device, thermal runaways arise and eventually damage the device if hotspots go undetected for more than, for example, a few ms. This time allowance to react before device degradation varies according to the conductor architecture, like thermal stabilizer, substrate material and presence of current flow diverter (CFD) which varies in order to increase protection and decrease cost.

For conductors like the previously mentioned Eccoflow conductor with low electric field, the longer conductor lengths required increase the cost as well the reaction time to (50 ms). The conductors manufactured for the Fastgrid project, however, are designed to have a limitation field of >100 V/m which is much higher than the Eccoflow conductor. This decreases the conductor lengths required, the cost and the available timeframe to detect a hotspot to about 30 ms.

The highly localized hotpots and fast response requirements make hotspot detection a challenge. In addition, the high voltage environment presents a difficulty by forbidding electronic detection methods. A hotspot detection technique with extremely fast response is therefore highly desirable for SFCLs exploitability. Currently, no hotspot detection technique is capable of catering to the quick hotspot detection requirement in SFCLs. For applications like SFCL protection, it is required to raise an alarm within small timeframes of 10-30 ms.

US20170179364A1 discloses optical fiber sensing using Rayleigh backscattering for hotspot detection in high temperature superconductors [8] and is capable of providing the temperature and location of the hotspot within the superconductor but remains slow (>100 ms measurement time) and expensive for SFCL protection. Not only is it slower but it is also more complicated in terms of analysis and comes with a much higher cost, making it unfeasible for largescale deployment, for example capillary grid use. The Rayleigh Backscattering technique provides additional data like the temperature and location of the hotspot while the device of the present disclosure focuses on measuring or determining the presence of a hotspot. While the additional data provided by Rayleigh backscattering is useful, it is supplementary and unnecessary for protecting the superconductor. The detection of the hotspot by means of the technique of the present disclosure is sufficient to assure protection of the superconductor.

While Rayleigh backscattering techniques are not fundamentally fast enough to protect an SFCL device, other quasi-distributed optical fiber sensing techniques like fiber Braggs gratings present the disadvantage of information loss between the effective sensing locations.

SUMMARY OF THE INVENTION

It is thus a goal of the present disclosure to address the above-mentioned inconveniencies.

The present invention addresses the above-mentioned limitations by providing a hotspot monitoring system for a superconductor device including a superconductor, a first optical waveguide attached to the superconductor for providing a first optical signal, a second optical waveguide for providing a reference signal, and interference means configured to overlay or superimpose the first optical signal and the reference optical signal to produce an optical interference signal.

The technique of the present disclosure uses an interferometer with an optical waveguide/fiber attached to a length of the superconductor. When the superconductor quenches, the optical interference signal shows a signature or periodic oscillations within, for example, 10 ms of a quench. This signature is caused by a phase-shift present in the optical signal from the optical waveguide/fiber attached to the superconductor with respect to the signal in a reference waveguide/fiber. This phase shift is dependent upon the length and temperature of the hotspot or hotspots in the superconductor.

As previously mentioned, the hotspot monitoring system enables an economical way to protect and monitor the health of superconductors in industrial applications allowing a largescale use of HTS applications. It is extremely feasible in terms of efficiency, cost and simplicity. The response is rapid which makes it ideal for applications requiring swift decision making.

The hotspot monitoring system of the present disclosure is an innovative way to protect the superconductor by detecting even singular hotspots and raising an alarm very quickly, for example, within 10 ms. It is a significant breakthrough capable of fast detection of even singular hotspots using optical waveguide/fiber sensing. This provides a way to make superconducting devices extremely usable not only for grid operation but also other HTS applications.

The present technique can enable, for example, the usage of Superconducting Fault Current Limiters (SFCLs) in the grid by providing an efficient way to monitor the superconductor health and raising the alarm with absolute or very high certainty to open a DC breaker to protect the device.

The hotspot monitoring system of the present disclosure is also useful for modern HTS cables to detect hotspots at high current levels. Installing the hotspot monitoring system and optical waveguide/fiber along the length of the cable conductor is a game changing way of monitoring HTS cable health and operating HTS cables. The hotspot monitoring system can be used in superconducting cables to offer protection and limitation against high currents. The hotspot monitoring system, therefore, can enable easier and safer operation of modern HTS cables and encourages increased HTS cable installations in the grid.

With this hotspot monitoring system, one can prevent thermal runaways in superconducting devices in a selective and efficient manner enabling their use in a wide range of HTS power applications and others.

The hotspot monitoring system includes an interferometer configuration, for example, a Mach-Zehnder Interferometer, and thus uses a much simpler way of detecting the hotspot which is extremely cheap and feasible for largescale use. The setup in a basic configuration may, for example, comprise only a laser source, two splitters and a detector (in addition to the optical waveguides). The output of the optical waveguide/fiber on the superconductor has a phase shift relative to the reference fiber, dependent upon temperature change and length of hotspot. This phase shift manifests itself much quicker as a clearly identifiable signature or periodic oscillations, for example, within 10 ms of a quench clearly signifying a hotspot.

The hotspot monitoring system is an extremely simple and cheap solution for superconductor protection. The hotspot monitoring system is extremely sensitive to hotspots and will facilitate the widespread use of superconductors in industrial applications by providing an efficient and cost-effective way to protect the device. It will be extremely feasible in terms of efficiency, cost and simplicity. The response is rapid which makes it ideal for applications requiring swift decision making.

Moreover, optical waveguides/fibers are lightweight, inert and robust making them an excellent solution for quench detection.

Optical waveguide/fiber sensing is an attractive solution to detect hotspots in SFCLs because optical fibers are capable of working in high voltage environments and offer numerous advantages of being inexpensive, lightweight and chemically inert (see also FIG. 5). Optical fibers can be seamlessly integrated in structures with a minimal impact on the host material, and various optical fiber sensing techniques enable measuring physical quantities such as temperature and strain along an optical fiber.

For applications like SFCL protection where it is required to raise an alarm within small timeframes of 10-30 ms, interferometer based optical fiber sensing, such as Mach-Zehnder Interferometer (MZI) based optical fiber sensing, assures extremely fast detection of hotspots. The interferometer based optical fiber sensing may not provide the hotspot location unlike Rayleigh backscattering, but is faster in terms of response and more cost effective in terms of setup. Hotspot location provides added value for data analysis but is not necessary for health monitoring. The interferometer based optical fiber sensing is sufficient for informing about the presence of a hotspot quickly and economically.

Importantly, the hotspot monitoring system can work in high voltage devices. The hotspot monitoring system has an excellent signal to noise ratio (SNR) and the results are simple to interpret requiring very straightforward algorithms for decision making.

Another aspect of the present disclosure concerns a grid or a high-voltage direct current grid or a meshed high-voltage direct current grid or a high-temperature superconductor cable or a fault current limiter or a motor or a generator or a magnetic resonance imaging MRI device or a high-field magnet apparatus including or consisting of at least one or a plurality of such superconductor.

Another aspect of the present disclosure concerns a method for determining a presence of a single or at least one hotspot or heating point in a superconductor. The method includes the steps of providing the above-mentioned hotspot monitoring system and determining the presence of a single or at least one hotspot or heating point in the superconductor from a signature present in the optical interference signal.

Yet another aspect of the present disclosure concerns a method for determining a presence of a single or at least one hotspot or heating point in a superconductor. The method includes the steps of providing a superconductor;

providing an optical system comprising or consisting solely of first and second optical waveguides for respectively providing a first optical signal and a reference optical signal, a light splitter configured to receive an input electromagnetic wave and to split the input electromagnetic wave to provide a first input optical signal to the first optical waveguide and a second input optical signal to the second optical waveguide, interference means configured to overlay or superimpose the first optical signal and the reference optical signal to produce an optical interference signal, an optical sensor configured to receive and capture the optical interference signal, and a light source configured to provide the input electromagnetic wave;

providing the above-mentioned hotspot monitoring system;

determining the presence of a single or at least one hotspot or heating point in the superconductor from a signature present in the optical interference signal.

The above and other objects, features and advantages of the present invention and the manner of realizing them will become more apparent, and the invention itself will best be understood from a study of the following description with reference to the attached drawings showing some preferred embodiments of the invention.

A BRIEF DESCRIPTION OF THE SEVERAL VIEWS OF THE DRAWINGS

FIG. 1 schematically shows the usage of a Superconducting Fault Current Limiter (FCL) in a circuit to monitor fault currents or abnormal electric currents above a critical current $I_c$ and allow protective actions to be taken, such as opening an associated circuit breaker shown in FIG. 1 to protect the circuit or an element thereof.

FIG. 2 shows critical current along the conductor length and shows that the critical current lies not at one value, as schematically shown in FIG. 1, but in a band defined between $I_{c\ max}$ and $I_{c\ min}$.

FIG. 3 schematically shows the mechanism for a Superconducting Fault Current Limiter (FCL) used in grids, as in FIG. 1, in a circuit to monitor fault currents or abnormal electric currents above a threshold value of critical current Ic whereby the circuit breaker is opened.

FIG. 4 schematically shows the inefficient technique used to protect SFCLs in a grid at present. The circuit breaker is opened when the current exceeds $I_N$ even if it does not lie in the critical current band (meaning no hotspot) leading to too frequent current breaker opening.

FIG. 5 schematically shows an exemplary optical waveguide used in the hotspot monitoring system of the present disclosure and associated advantages.

FIG. 6A schematically shows an exemplary embodiment of a hotspot monitoring system of the present disclosure.

FIG. 6B schematically shows another exemplary embodiment of a hotspot monitoring system of the present disclosure.

FIG. 7A schematically shows an exemplary embodiment of a superconductor of the present disclosure.

FIG. 7B schematically shows another exemplary embodiment of a superconductor of the present disclosure.

FIG. 8 schematically shows an experimental setup used to perform measurements on an exemplary embodiment of a hotspot monitoring system of the present disclosure.

FIG. 9 schematically shows another similar experimental setup used to perform measurements on an exemplary embodiment of a hotspot monitoring system of the present disclosure.

FIGS. 10A and 108 are images of the experimental setup of FIG. 8.

FIGS. 11A to 11E show measurements taken during experimentation using the experimental setup of FIG. 8.

Figure 9:
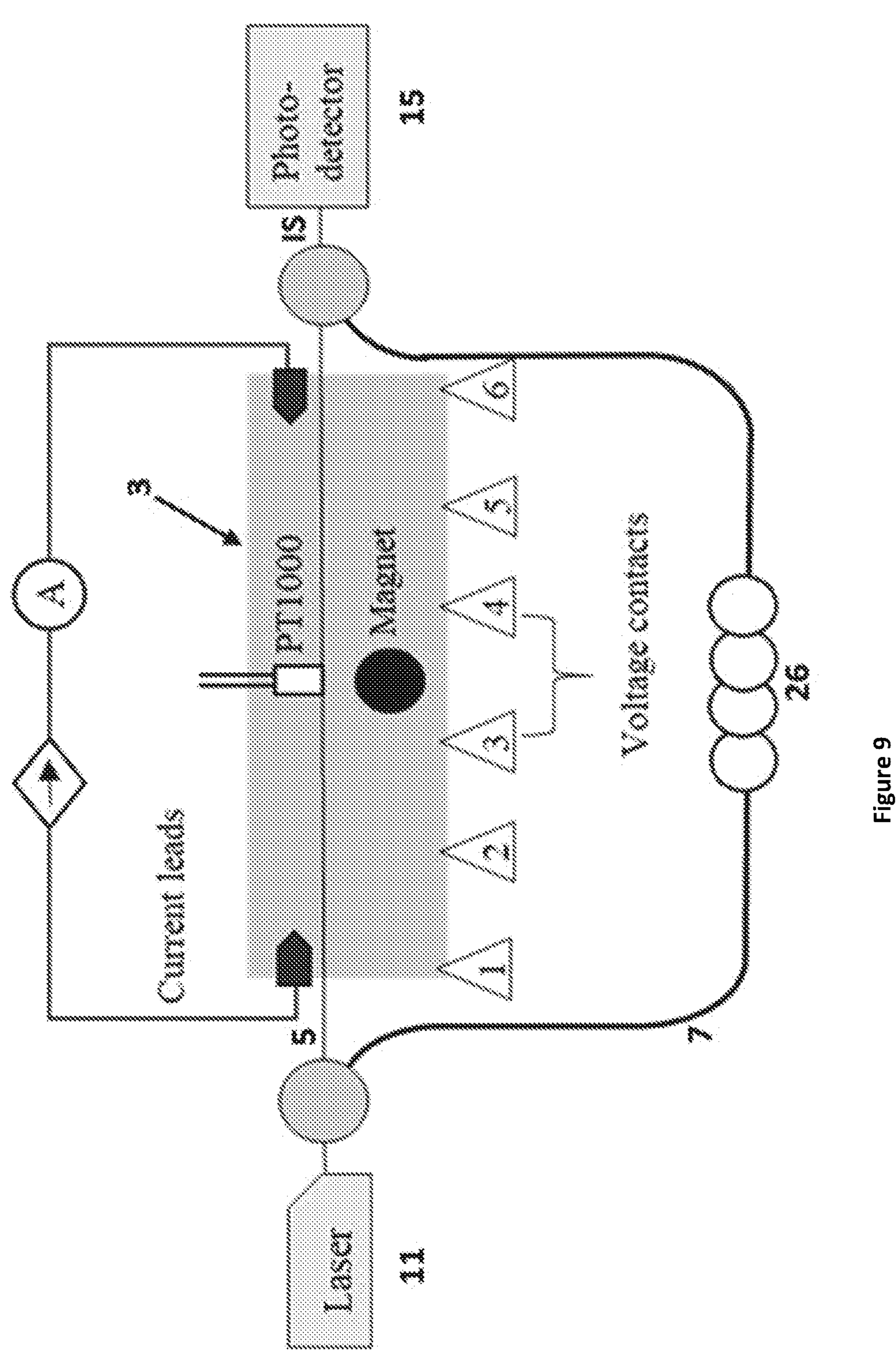
Figure 12A:
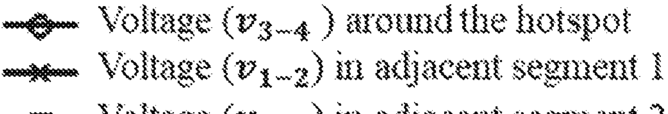
Figure 12A:
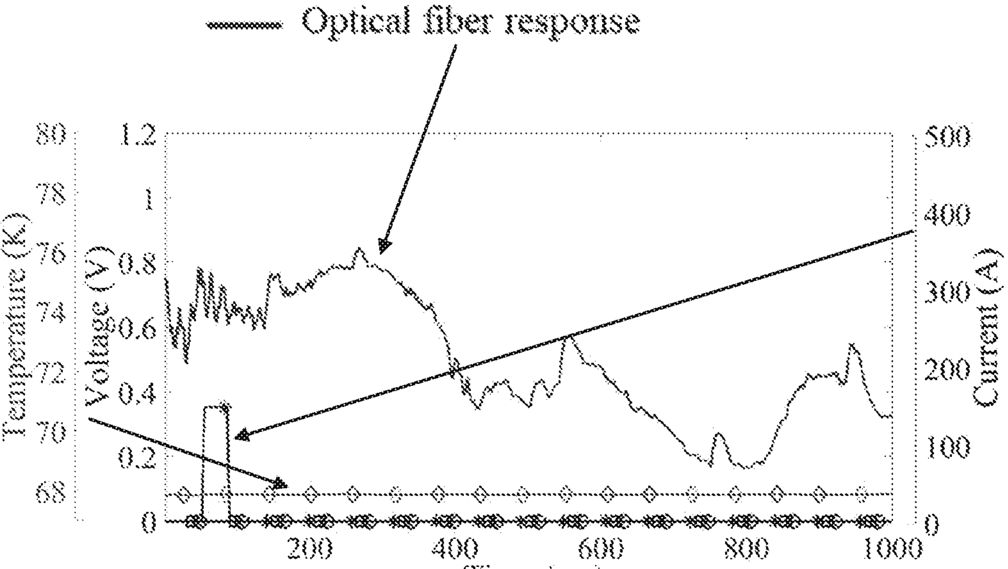
Figure 12B:
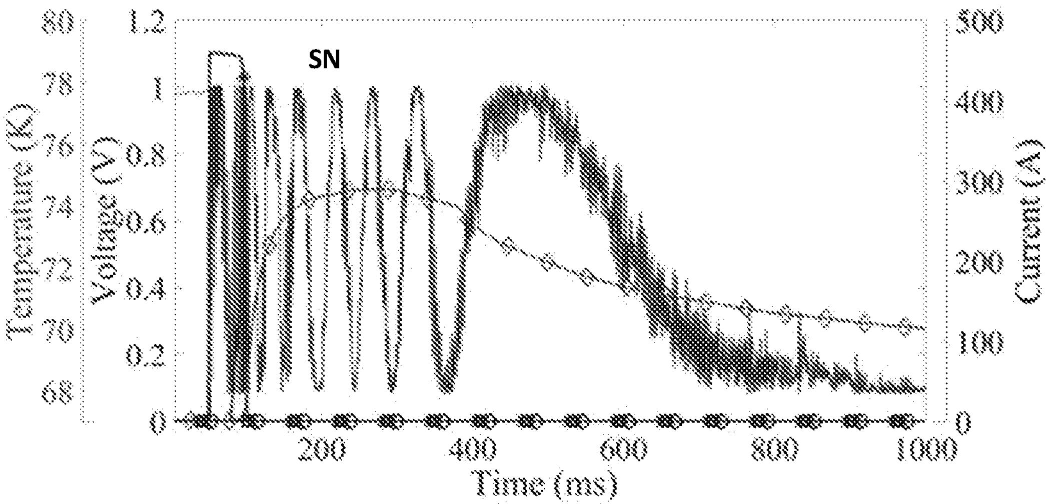
Figure 12C:
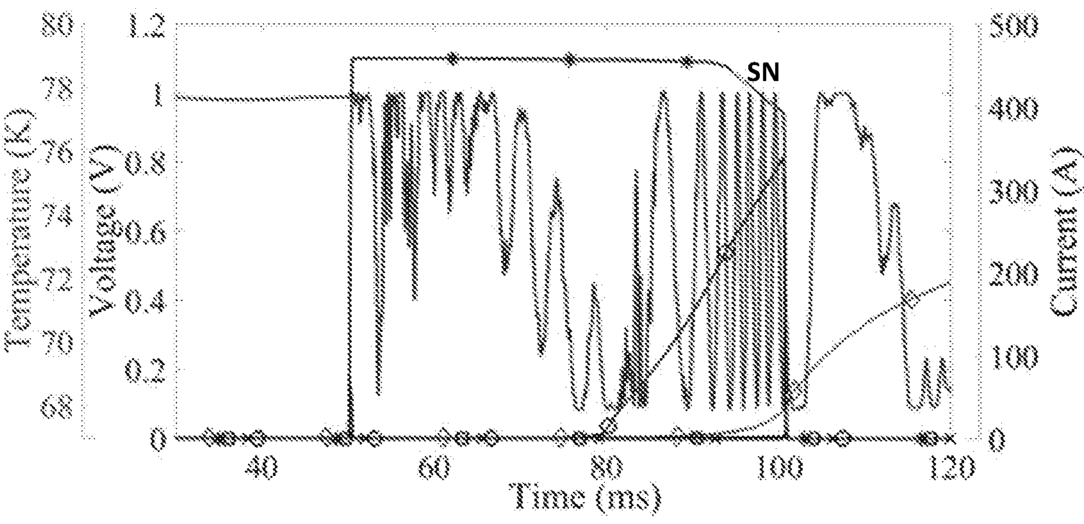

FIGS. 12A to 12C show measurements taken during experimentation using the experimental setup of FIG. 9. FIG. 12A shows experiment results for no hotspot, the MZI response shows slow variations with no visible pattern. FIG. 12B shows that the technique detects a single hotspot in the superconductor, temperature curve and corresponding optical fibre response for which is observed in this. FIG. 12C is a closer look at FIG. 12B showing that the optical fibre shows instantaneous oscillatory response to the hotspot, as voltage around the hotspot begins to rise.

Figure 13A:
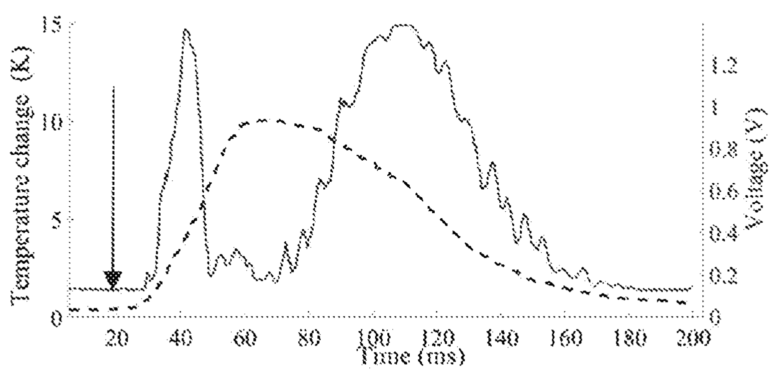
Figure 13B:
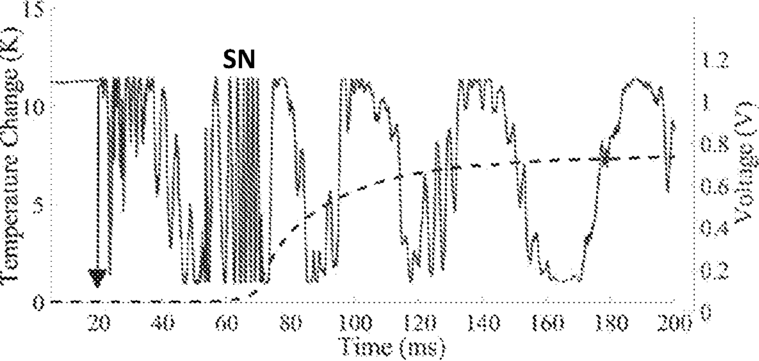

FIGS. 13A and 13B show a comparison of the present technique response to the same temperature change of 10K. In FIG. 13A the setup sensitivity is lowered due to a weak optical fibre coupling with the sample and in FIG. 13B strong mechanical coupling between the sample and optical fibre allows a stronger strain sensitive and more rapid response that is observed before the temperature increase in the PT1000.

Figure 14:
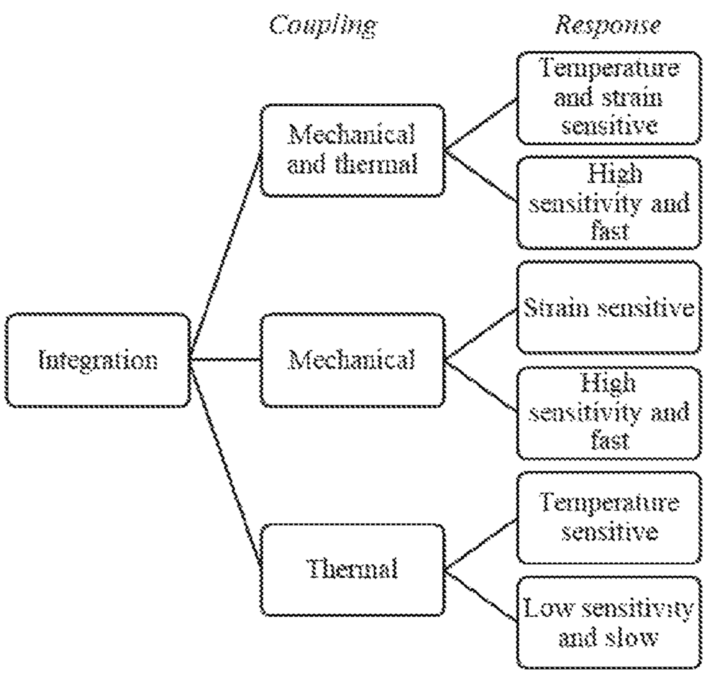

FIG. 14 shows a dependence of the technique response of the present disclosure on quality of integration.

Figure 15:
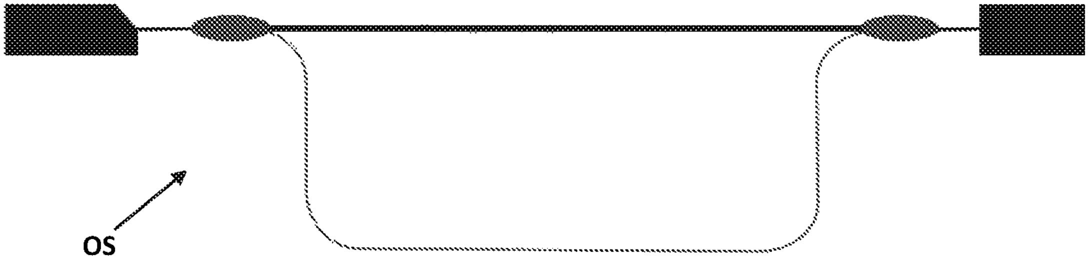

FIG. 15 schematically shows an exemplary superconductor monitoring or protection device according to the present disclosure.

Figure 16:
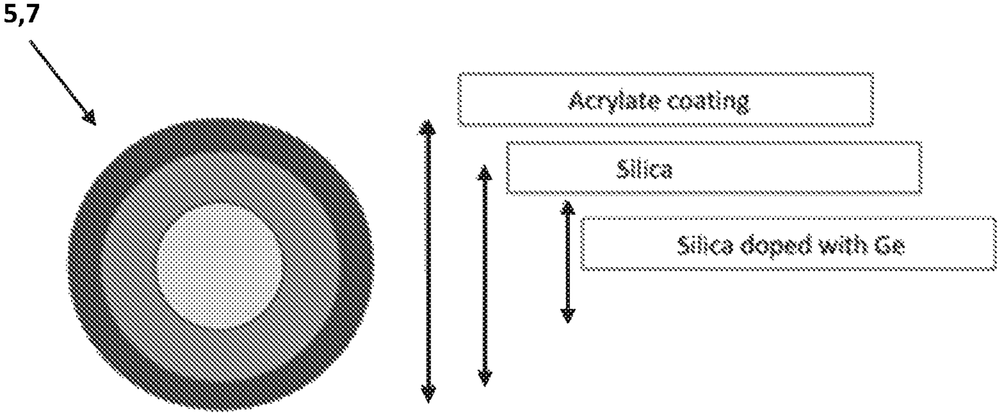

FIG. 16 schematically an exemplary optical fiber that may be used in the hotspot monitoring system of the present disclosure.

Herein, identical reference numerals are used, where possible, to designate identical elements that are common to the Figures.

DETAILED DESCRIPTION OF SEVERAL EMBODIMENTS

Figures 1, 2:
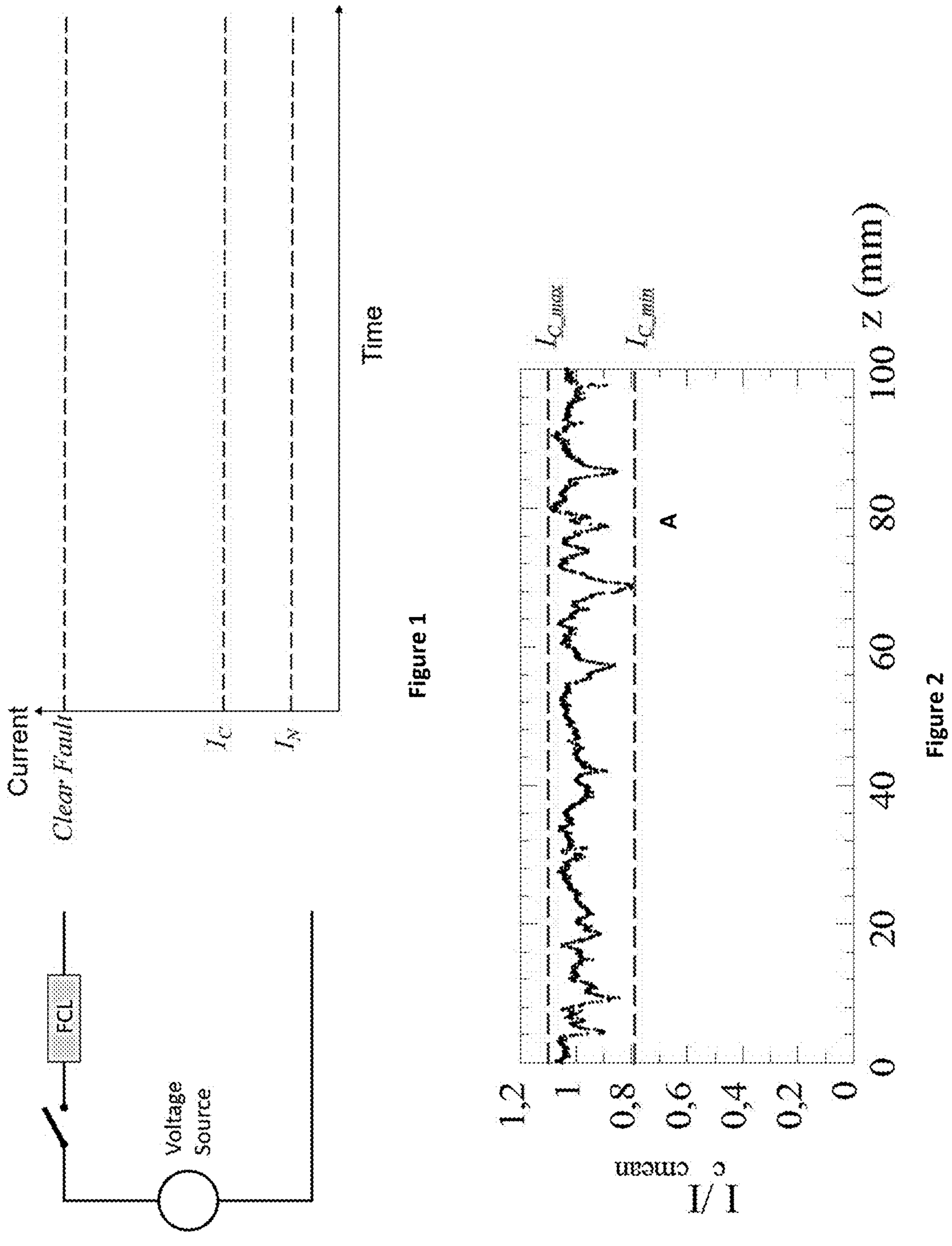
Figures 3, 4:
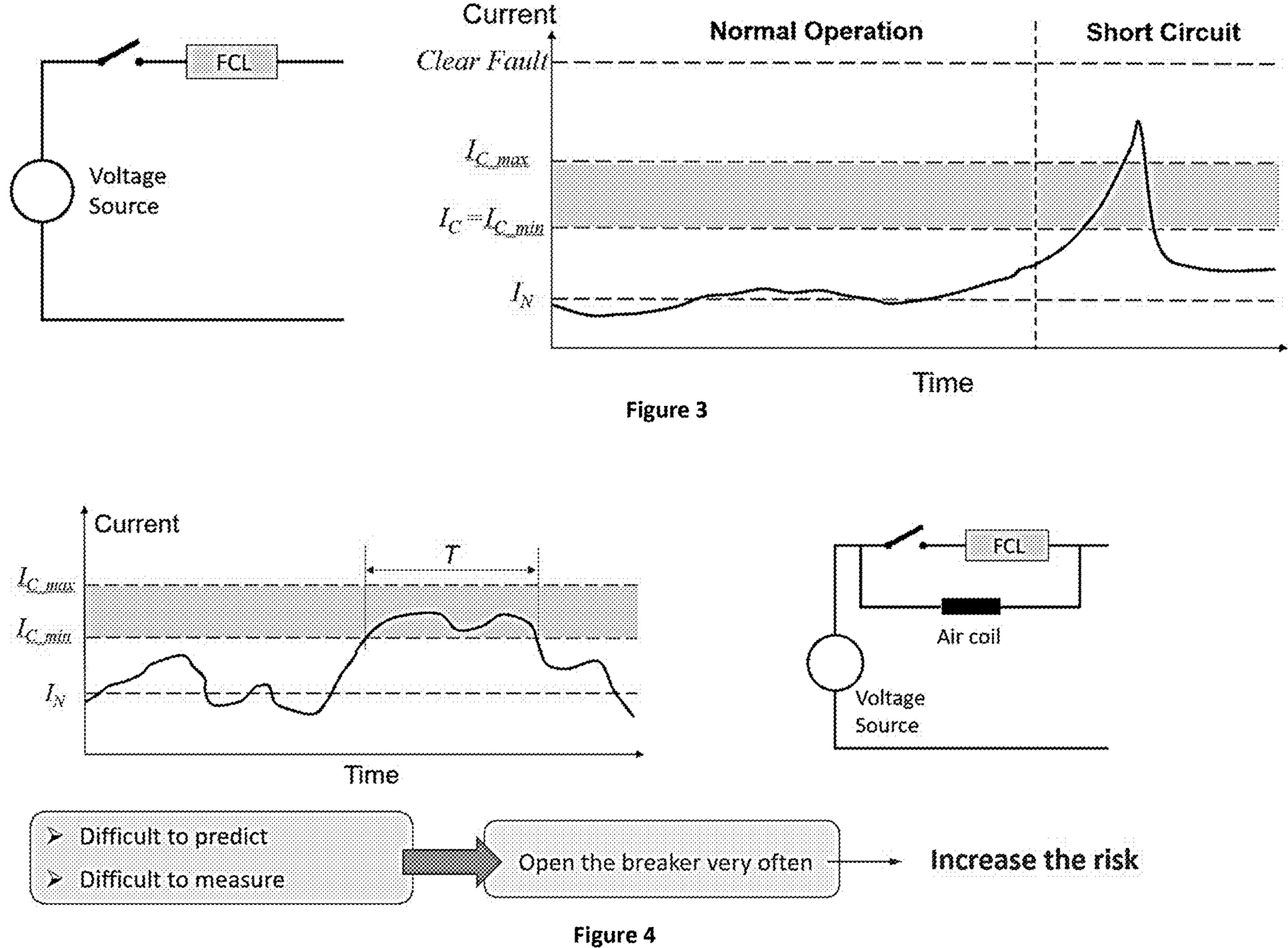
Figure 5:
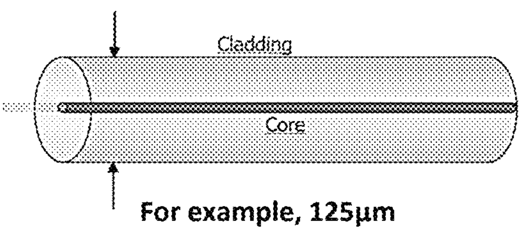
Figure 6A:
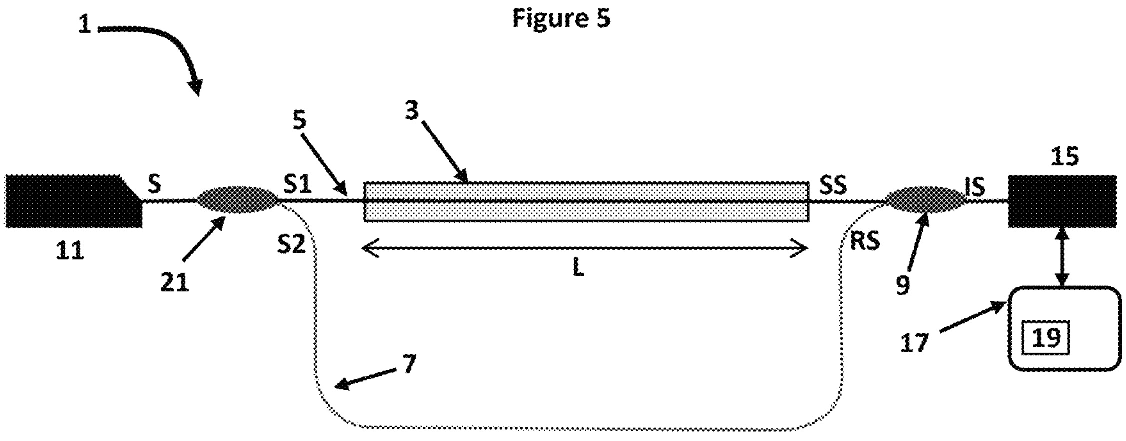
Figure 6B:
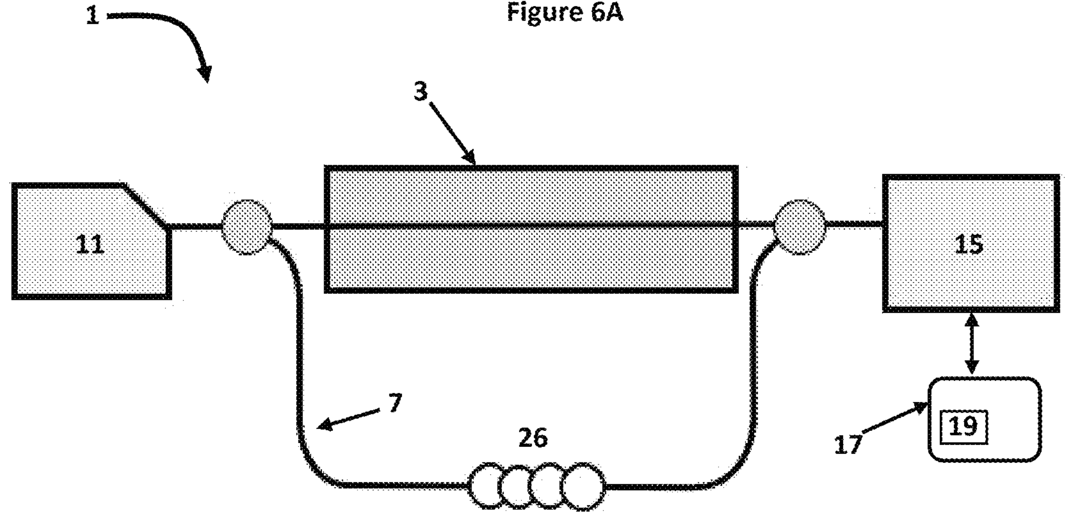

FIGS. 6A and 6B schematically show exemplary superconductor devices, hotspot monitoring systems or superconductor systems 1 (or a hotspot monitoring system/device 1 for a superconducting device/element) according to the present disclosure.

The hotspot monitoring system 1 include a superconductor 3 (or superconductor element or assembly 3), at least a first optical waveguide 5 attached to the superconductor 3 for providing a first optical signal SS that has propagated through the first optical waveguide 5 and at least a second optical waveguide 7 for providing a reference signal RS that has propagated through the second optical waveguide 7.

A superconductor being a material or substance that conducts electricity without resistance when it becomes colder than a critical temperature.

The hotspot monitoring system 1 further includes optical interference means or component 9 configured to overlay or superimpose the first optical signal SS and the reference optical signal RS to produce an optical interference signal IS.

The hotspot monitoring system 1 may further include a further including a light source 11 configured to provide an input electromagnetic wave S. The light source 11 comprises or consists of a coherent light source or a partially coherent light source. The light source 11 may, for example, comprises or consists of a LED or a laser, for example, a semiconductor laser. The light source 11 may, for example, be configured to emit light in a wavelength range of 1310 nm to 1650 nm.

An exemplary light source includes a distributed feedback (DFB) semiconductor laser. Such a laser is commercialized by the Company EmCore. The exemplary wavelength used can be, for example, (around) 1551 nm.

The hotspot monitoring system 1 may also include an optical sensor 15 configured to receive and capture the optical interference signal IS. The optical sensor 15 comprises or consists of a camera, a photodetector, a photodiode, an active-pixel sensor, or a charge coupled device CCD.

The first optical waveguide 5 and/or the second optical waveguide 7 may, for example, comprise or consist of an optical fiber. The first optical fiber 5 and/or the second optical fiber 7 may, for example, comprise or consist of a single-mode optical fiber or a multi-mode optical fiber or a photonic-crystal fiber.

The first optical fiber 5 and/or the second optical fiber 7 may, for example, include a core, and a surrounding cladding layer. The first optical fiber 5 and/or the second optical fiber 7 may also include an outer protection layer. The outer protection layer may enclose the core and cladding layers.

The first optical fiber 5 and/or the second optical fiber 7 may, for example, comprise or consist of a glass or silica optical fiber.

FIG. 16 shows a non-limiting example of an optical fiber that may be used. The exemplary optical fiber used includes an outer acrylate coating, a silica core doped (slightly) with Ge and a silica cladding. An exemplary cross section of the fiber is shown where the core thickness is for example 10 μm, the cladding extends to 125 μm and the coating to 250 μm. These indicated thicknesses are non-limiting exemplary thicknesses.

The outer coating of the first and/or second fibers 5, 7 may comprise or consist of a metallic or polymer coating. This may be an additional or alternative coating to the outer coating previous mentioned.

The hotspot monitoring system 1 may further include a processing device 17 configured to receive, from the optical sensor 15, the time-varying optical interference signal IS detected or measured by optical sensor 15 and further configured to determine the presence of a single or at least one hotspot or heating point in the superconductor 3 from a signature SN present in the optical interference signal IS detected or measured by the optical sensor 15.

A hotspot generates an optical path change for the light propagating in the first optical waveguide 5 resulting in a temporally changing optical interference signal IS containing a characteristic a signature or signatures SN that can be exploited to determine, with very high or full certainty, the generation of a hotspot or quench in the superconductor.

As mentioned, a hotspot or quench means a transition to a normal resistive state from a superconducting state. Localized heating is present when a hotspot or quench is present. The transition to the normal resistive state can be an irreversible transition. The increase in temperature can effect surrounding regions and push those regions into the normal resistive state leading to more heating in a chain reaction.

The signature SN comprises or consists of a pre-defined phase-shift change, or amplitude oscillation in the optical interference signal measured by the optical sensor 15. The pre-defined phase-shift change comprises or consists of a change or rapid change in phase shift from 0 to 2$\pi$. The amplitude oscillation can be periodic. The amplitude oscillatory response defines a Consinus amplitude oscillation or oscillations or a rapid Consinus amplitude oscillation or oscillations.

The signature SN may alternatively comprise a signature in the frequency of the optical interference signal measured by the optical sensor 15 whereby a non-zero frequency present in a time interval means periodic oscillations are present and thus a quench or hotspot.

The processing device 17 includes, for example, a processor and a memory 19 containing processor executable instructions to carry out, at least, a determination of the presence of the signature SN. Processor executable instructions may further be included to communicate a determination of the presence of the signature SN to a further or external device configured to take responsive action to this hotspot determination.

The hotspot monitoring system 1 may further include an optical splitter or light splitter 21 configured to receive the input electromagnetic wave S and to split the input electromagnetic wave S into (i) at least a first input optical signal S1 and provide the first input optical signal S1 to the first optical waveguide 5 and (ii) at least a second input optical signal S2 and provide the second input optical signal S2 to the second optical waveguide 7.

The light splitter 21 may, for example, comprise or consist solely of an optical beam-splitter (for example, a cubic beam splitter). One or more lens may be used upstream of the optical beam-splitter to couple the split light S1, S2 into the first and second optical waveguides 5, 7 respectively.

Alternatively, and in a preferred embodiment, the light splitter 21 may, for example, comprise or consist solely of at least one fiber optic splitter (for example, a Fused Biconical Taper (FBT) splitter or a Planar Lightwave Circuit (PLC) splitters). The fiber optic splitter is a passive fiber optic splitter. The fiber optic splitter is, for example, configured to divide the input light power of the input light S provided to an input channel and send it to different output channels (at least two). The input channel may be defined by an input fiber of the fiber optic splitter 21 with the input light S being provided to this input fiber. The output channels may be defined by output fibers of the fiber optic splitter 21 that are connected to the first and second optical waveguides 5, 7. Alternatively, the first and second optical waveguides 5, 7 may be directly connected to the fiber optic splitter 21 to define the output channels.

In a preferred embodiment, the interference means or component 9 may comprises or consists of an optical coupler configured to combine the first optical signal SS and the reference optical signal RS to overlay or superimpose the first optical signal SS and the reference optical signal RS to produce the optical interference signal IS. The optical coupler is, for example, configured to combine the first optical signal SS and the reference optical signal RS for propagation along or on one and the same optical path.

The interference means or component 9 may, for example, comprises or consists of at least one fiber optic coupler (or splitter). The fiber optic coupler is configured to operate in a similar manner to the abovementioned fiber optic splitter but with input and output channels being reversed. A first output channel receives the first optical signal SS and a second output channel receives the reference optical signal RS and send the signals SS, RS into one input channel of the fiber optic coupler (splitter).

Input fibers of the fiber optic coupler may be connected to the first and second optical waveguides 5, 7. Alternatively, the first and second optical waveguides 5, 7 may be directly connected to the fiber optic coupler to define the input channels.

An output fiber of the fiber optic coupler in which the first optical signal SS and the reference optical signal RS is combined propagates the combined signals SS, SD and the resulting optical interference signal IS for measurement. The output fiber of the fiber optic coupler may be connected to the optical sensor 15 to directly provide the interference signal IS to the optical sensor 15.

Alternatively, the interference means or component 9 may, for example, comprises or consists of a plurality of lenses arranged to receive the signal SS, RS exiting the first and second waveguides 5,7 and arranged to overlay or superimpose the first optical signal SS and the reference optical signal RS to produce the optical interference signal IS. The interference signal IS may be projected onto the optical sensor 15.

Similarly, the interference means or component 9 may, for example, comprises or consists of a least one or a plurality of mirrors arranged to overlay or superimpose the first optical signal SS and the reference optical signal RS to produce the optical interference signal IS. Alternatively, the interference means or component 9 may, for example, comprises or consists of at least one or a plurality of mirrors and a beam-splitter arranged to overlay or superimpose the first optical signal SS and the reference optical signal RS to produce the optical interference signal IS.

The hotspot monitoring system 1 may optionally further include a polarization control device 26 as shown in FIG. 6B. The polarization control device 26 is configured to adjust the polarization of the light present on the reference arm or propagating in the second optical waveguide 7 permitting the light polarization in both branches, that is in the first and second waveguides, to be aligned (or largely aligned) at the coupler or interference means or component 9. This permits the signal to noise ratio (SNR) to be improved. Similar to FIG. 6A, lightwaves transmitted through the two branches are recombined and converted into an electric signal via, for example, a photo detector. This output from the detector is an interference pattern IS with a phase dependent upon change in temperature and strain in the superconductor 3 and this property is used to detect hotpsots.

The first optical waveguide 5, the second optical waveguide 7 and the interference means 9 are arranged to implement an interferometer to produce the optical interference signal IS. The first optical waveguide 5, the second optical waveguide 7 and the interference means 9 are arranged to determine a relative phase-shift or relative phase-shift variation between the first optical signal SS having propagated through the first optical waveguide 5 and the reference optical signal RS having propagated through the first optical waveguide 5 via the optical interference signal IS produced by the first optical signal SS and the reference optical signal RS.

The hotspot monitoring system 1 may include a plurality of sets of first and second waveguides each arranged to implement an interferometer to produce an optical interference signal IS.

In a preferred embodiment, the first optical waveguide 5, the second optical waveguide 7 and the interference means 9 are arranged to implement a Mach-Zehnder interferometer to produce the optical interference signal IS.

The hotspot monitoring system 1 may comprise an optical system OS (see, for example, FIG. 15) comprising or consisting solely of the first and second optical waveguides 5,7, the light splitter 21, and the interference means 9; or the first and second optical waveguides 5, 7, the light splitter 21, the interference means 9, the optical sensor 15 and the light source 11.

The first optical waveguide 5 is attached to the superconductor 3 directly or indirectly. The first optical waveguide 5 is attached along a length L of the superconductor 3 in which the superconductor 3 extends in an elongated manner. Preferably, the first optical waveguide 5 is attached along a full-length L of the superconductor 3 to assure a comprehensive protection of the device. The first optical waveguide 5 may extend linearly or non-linearly across the superconductor 3. The first optical waveguide 5 may extend, for example, in a serpentine or meandering manner across the superconductor 3 to further increase sensitivity to hotspot generation.

The second optical waveguide 7 is preferably non-attached to the superconductor 3 or located at a distance from the superconductor material 23 of the superconductor 3 to assure high sensitivity. The second optical waveguide 7 may nevertheless be attached to the superconductor 3. In such a case, it is preferably located at a distance from the superconductor material 23 of the superconductor 3. The optical path length followed by the reference optical signal RS remains unaffected or little affected by any hotspot generation in the superconductor 3 when located at a distance from the superconductor material 23 of the superconductor 3. The second optical waveguide 7 is preferably located at a greater distance from the superconductor material 23 than the first optical waveguide 5, for example, at least 5 or 10 times greater.

The superconductor 3 (or superconductor element or assembly 3) comprises the superconductor material or layer 23 and a host material or substrate 25 upon which the superconductor material 23 is located directly or indirectly in contact therewith.

A length L of the superconductor 3 may have a large range of values. For example, the length L may vary from a few centimeters or many meters. For example, the length may be between 0.01 m to 20 m, or for example, between (i) 0.01 m, 0.05 m. 0.1 m or 0.2 m and (ii) 5, 10, 12, 15 or 20 m.

The superconductor 3 may define a laminated structure or a plated structure in which the superconductor material 23 and substrate 25 are encapsulated by a metallization layer and/or a stabilization layer.

The superconductor material or layer 23 may also one or more additional layers provided upon the superconductor material 23, or enclosing or surrounding the superconductor material 23. For example, one or more buffer layers 27 may be located between the superconductor material or layer 23 and the host material or substrate 25. A solder layer 29 may be located between a metallization layer 31 and the stabilization layer 33.

The first optical waveguide 5 may, for example, be attached directly or indirectly to an outer surface of the superconductor 3.

The first optical waveguide 5 may, for example, be embedded partially or fully inside the superconductor 3.

The first optical waveguide 5 may, for example, be embedded partially or fully in the host material or substrate 25. The first optical waveguide 5 may, for example, be attached directly or indirectly to an outer surface of the superconductor 3 defined by the host material or substrate 25.

The first optical waveguide 5 may, for example, be attached to the superconductor 3 at a location closest to or at a minimum distance from the host material or substrate 25.

Figure 7A:
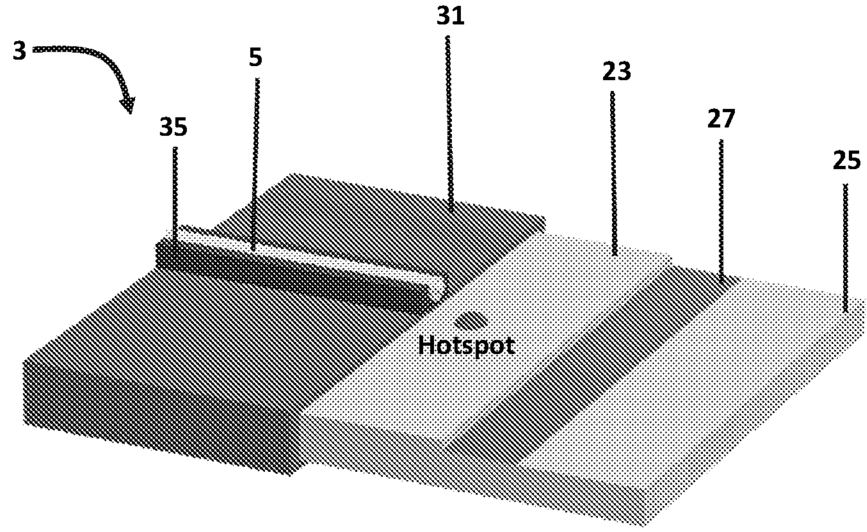
Figure 7B:
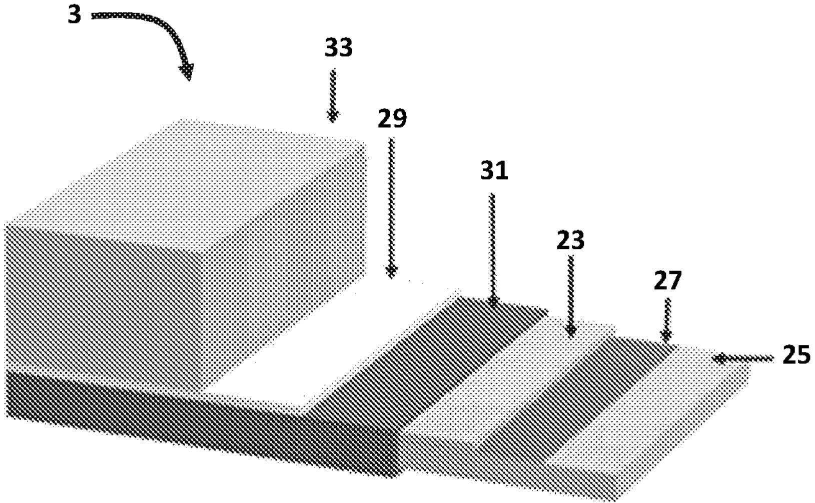

FIGS. 7A and 7B show non-limiting exemplary structures or architectures of the superconductor 3, and more specifically show exemplary tape architectures.

FIG. 7A shows a superconductor structure 3 comprising a host material or substrate 25 (for example, Hastelloy 97 μm), a buffer layer 27 (for example, MgO 0.27 μm), a superconductor material or layer 23 (for example, GdBCO or YBCO 3 μm), and an encapsulating metallization layer 31 (for example, all around silver 1.7 μm). The first optical waveguide 5 is attached to the encapsulating metallization layer 31 via a coupling device 35.

FIG. 7A thus shows an exemplary superconductor 3 comprising or consisting of superconducting material 23 contained in a superconducting tape, for example, a superconducting tape manufactured by the company Theva. The tape architecture can comprise multiple layers around the superconducting material or layer 23. The superconducting material 23 in that layer can comprise or consist of, for example, GdBCO also called YBCO.

FIG. 7B shows a similar superconductor structure 3 with the differences that the superconductor material or layer 23 consists of GdBCO or YBCO 1 μm), and a stabilization layer 33 (for example, 0.5 μm and/or comprising Copper or Hastelloy stabilizer) attached to the metallization layer 31 via a solder layer (for example, all around silver 1.7 μm). The first optical waveguide 5 can be attached to the encapsulating metallization layer 31 or alternatively to stabilization layer 33.

The optical waveguide 5 can be located on either side of the tape structure, for example, in direct or indirect contact with the thermal stabilizer 33 or the silver layer/enclosure 31. The thermal stabilizer 33 may optionally be absent. The optical waveguide 5 may be placed on either side of the superconducting tape 3.

Other non-limiting examples of the superconductor material 23 comprises or consists of at least one of: rare earth barium copper oxide (REBCO) superconducting material, or bismuth strontium calcium copper oxide (BSCCO) superconducting material, or YBCO (or GdBCO), or $MgB_2$.

The superconductor 3 and/or superconductor material 23 may comprise or consist of a high-temperature superconductor HTS. The superconductor 3 and/or superconductor material 23 may comprise or consist of a low-temperature superconductor LTS. The distinction between a high-temperature superconductor HTS and low-temperature superconductor LTS can be found in Prozorov R 2016 Superconductors, 1. the Phenomenon of Superconductivity and Fundamental Properties *Ullmann's Encyclopedia of Industrial Chemistry* (American Cancer Society) pp 1-9.

As mentioned, the hotspot monitoring system 1 may further include the coupling device 35 configured to mechanically and/or thermally couple the first optical waveguide 5 to the superconductor 3. The coupling device 35 can be in direct contact with the superconductor 3.

The coupling device 35 extends, for example, to fully attach the first optical waveguide 5 to the superconductor 3 at every location the first optical waveguide 5 extends across the superconductor 3. The section of the first optical waveguide 5 that extends across the superconductor 3 is fully attached to the superconductor 3 by the coupling device 35. This assures a highly sensitive detection of hotspots and single hotspots. The coupling device 35 fully interfaces the surface of the first optical waveguide 5 running across the superconductor 3 to the superconductor 3 (or the surface of the superconductor 3).

The coupling device 35 mechanically and thermally connects the first optical waveguide 5 running across the superconductor 3 to the superconductor 3. The mechanical connection couples the first optical waveguide 5 to strain (structural or mechanical) generated in the superconductor 3 or the host material/substrate 25 by hotspot thermal heating. This allows the optical waveguide 5 to be structurally modified by the presence of a hotspot. This assures a highly sensitive device 1.

The coupling device 35 is, for example, configured to partially or fully enclose or encapsulate the first optical waveguide 5.

The coupling device 35 is, for example, configured to provide a high thermal conductivity and a low thermal expansion.

The coupling device 35 may, for example, comprise or consist of an adhesive, epoxy or glue. For example, an adhesive that functions at cryogenic temperatures, or an adhesive that functions at cryogenic temperatures and provides (good) mechanical and/or thermal coupling. For example, a STYCAST® epoxy can be used, for instance, STYCAST® 2850FT epoxy.

Alternatively, a polyimide film or tape could be used, for example, Kapton film or tape. This is optional and the coupling device 35 may, for example, not comprise or consist of a polyimide film or Kapton film or tape.

The first optical waveguide 5 is thus attached to the superconductor 3 using an adhesive, epoxy or glue.

The adhesive epoxy or glue is, for example, a high thermal conductivity adhesive, epoxy or glue.

The hotspot monitoring system or system 1 may further include a current breaker (or direct current breaker), or a deviation circuit containing a parallel circuit path of higher impedance.

Processor executable instructions may further be included in the memory 19 of the processing device 17 to active opening of the current breaker or deviate current to the deviation circuit upon determination of the presence of the signature SN or hotspot. This can also be done via communication to a further or external device configured to take this responsive action.

The present disclosure also concerns a Grid (or power transmission network); a high-voltage direct current (HVDC) Grid; or a meshed high-voltage direct current (HVDC) Grid; or a high-temperature superconductor (HTS) cable; or a fault current limiter (FCL) or a motor or a generator or a Magnetic resonance imaging (MRI) device or a high-field magnet apparatus including or consisting of at least one or a plurality of superconductor device/hotspot monitoring systems 1.

According to another aspect of the present disclosure, the hotspot monitoring system or system 1 as previously described does not include the superconductor 3. The hotspot monitoring system or system 1 is thus a superconductor monitoring or protection device (or system) 1 that includes some or all of the other elements (in any combination) described herein. For example, a superconductor monitoring or protection device 1 including or consisting of the optical system OS shown in FIG. 15.

The present disclosure also concerns a method for determining a presence of a single or at least one hotspot or heating point in the superconductor or the superconductor material. The method includes, for example, providing the hotspot monitoring system 1 and determining the presence of a single or at least one hotspot or heating point in the superconductor 3 or superconductor material from the signature SN present in the optical interference signal IS.

Alternatively, the method includes providing the superconductor 3; and providing the optical system comprising or consisting solely of the first and second optical waveguides 5, 7, the light splitter 21, interference means 9, the optical sensor 15, and the light source 11.

The method also includes providing the hotspot monitoring system 1 and determining the presence of a single or at least one hotspot or heating point in the superconductor 3 or superconductor material from the signature SN present in the optical interference signal.

As previously mentioned, the presence of a single or at least one hotspot or heating point from the optical interference signal IS is determined by determining the presence of a pre-defined phase-shift change or amplitude oscillation in the optical interference signal IS. The pre-defined phase-shift change is a change (or rapid change) or a plurality of changes (or rapid changes) in phase shift from 0 to 2π. Signaling of the presence of a single or at least one hotspot or heating point in the superconductor 3 can be performed. Activation of the current breaker or deviation circuit can be carried out when the presence of a single or at least one hotspot or heating point in the superconductor is determined. The present disclosure may make use, for example, of a Mach-Zehnder Interferometer. An exemplary setup, such as that shown in FIG. 6A, 6B or 9 may for example include two optical fibers 5,7, one attached/glued to the surface of the superconductor 3 and the second one 7 acts as a reference optical fiber. A laser source 11 is present on one end and a detector 15 on the other. Light is split into two at the laser source end and recombined at the detector end. The temperature change and/or structural change in the superconductor 3, caused due to hotspots, induces a rapid change in phase shift from 0 to 2π. This phase shift is also dependent on the length of the heating (hotspot) and the temperature and strain in the heated region (see equation (2) below). At the detector output this phase shift manifests itself as rapid amplitude variations, from a lower value to an upper value, for example, from 0 to 1 (as per equation (1) below), which is interpreted as the presence of a hotspot.

Not wishing to be held to any one particular theory, a working principle is nevertheless proposed by the Inventors and can be understood as follows making use of the following variables:

$\phi_{12}$ Initial phase shift between the two light paths
$\Delta\phi_H$ Phase shift due to hotspot and ambient factors
ε Mechanical strain in the optical fibre
ΔT Temperature change due to the hotspot
n Optical fibre refractive index
$\alpha_0$ Thermal expansion coefficient of the optical fibre
ξ Thermo-optic coefficient of the optical fibre
$\rho_a$ Photo-elastic coefficient of the optical fibre The recombined electric signal output from the detector 15 (i.e. the interference pattern IS) can be expressed as:

$$\text{Interference Pattern} \propto [1+\cos(\phi_{12}-\pi+\Delta\phi_H)] \quad (1)$$

where $\Delta\phi_H$ depends on the change in strain (Δε) and temperature (ΔT) as expressed in equation (2) [10]. Together, the two temperature and strain dependent phenomena affect the MZI response sensitivity.

$$\Delta\phi_H \propto (\{1-\rho_a\}\Delta\varepsilon+[\alpha_O+\xi]\Delta T) \quad (2)$$

When there is no hotspot in the superconductor 3, both Δε and ΔT are caused by environmental perturbations (environmental temperature variation and acoustic noises), resulting in a slow variation of $\Delta\phi_H$, so that the interference pattern or signal show slow fluctuations that do not exhibit a significant pattern. In the presence of a hotspot, the local heating gives rise to a temperature increment (ΔT with positive sign) at the corresponding fibre position, meanwhile the local thermal expansion of the substrate 25 (Hastelloy) or superconductor structure 3 imposes a local elongation (Δε with positive sign) of the optical fibre. This can result in a significant and continuous increment of $\Delta\phi_H$, from 0 to 2π, within few ms, as the temperature of the hotspot increases sharply. Due to this $\Delta\phi_H$ change, at the detector output the interference pattern manifests as continuous, periodic amplitude variations between 0 and 1 (when normalized), with a frequency dependent upon the rate of temperature change (a higher frequency signifying a faster temperature change); this indicates the presence of (at least) a single or multiple hotspots.

The composite optical fibre 5 response comprises of a strain response and a thermal response. The optical fiber thermal sensitivity is defined by two parameters: the thermo-optic coefficient (ξ) and the thermal expansion coefficient ($\alpha_o$), which contribute to the temperature dependent term in equation (2). In the thermal response at room temperature, ξ plays a more significant role as compared to a., owing to the very low thermal expansion of the optical fiber material, silica. At cryogenic temperatures however, it has been experimentally demonstrated that the thermal sensitivity reduces due to a sharp decrease in ξ: the value of ξ is $9\times10^{-6}K^{-1}$ at room temperature which decreases by three times to $3\times10^{-6}$ $K^{-1}$ at 77 K[11]. For improving thermal sensitivity, approaches of recoating optical fibres with metallic or polymer coatings to enhance the thermal expansion coefficient have been studied for techniques like FBG [12]. It has also been discovered in studies that the overall decrease in the temperature sensitive term ($\alpha_0$+ξ) makes it possible to perform strain dominated measurements at cryogenic temperatures [13]. The strain sensitivity, is dominated by strain imposed on the optical fiber due to the thermal contraction or expansion of the host material 25, in this case, the Hastelloy. For even higher strain sensitivity, the integration of the optical fibre 5 to the superconductor 3 should be appropriate to maximise strain transfer from the host material to the optical fibre.

Figure 8:
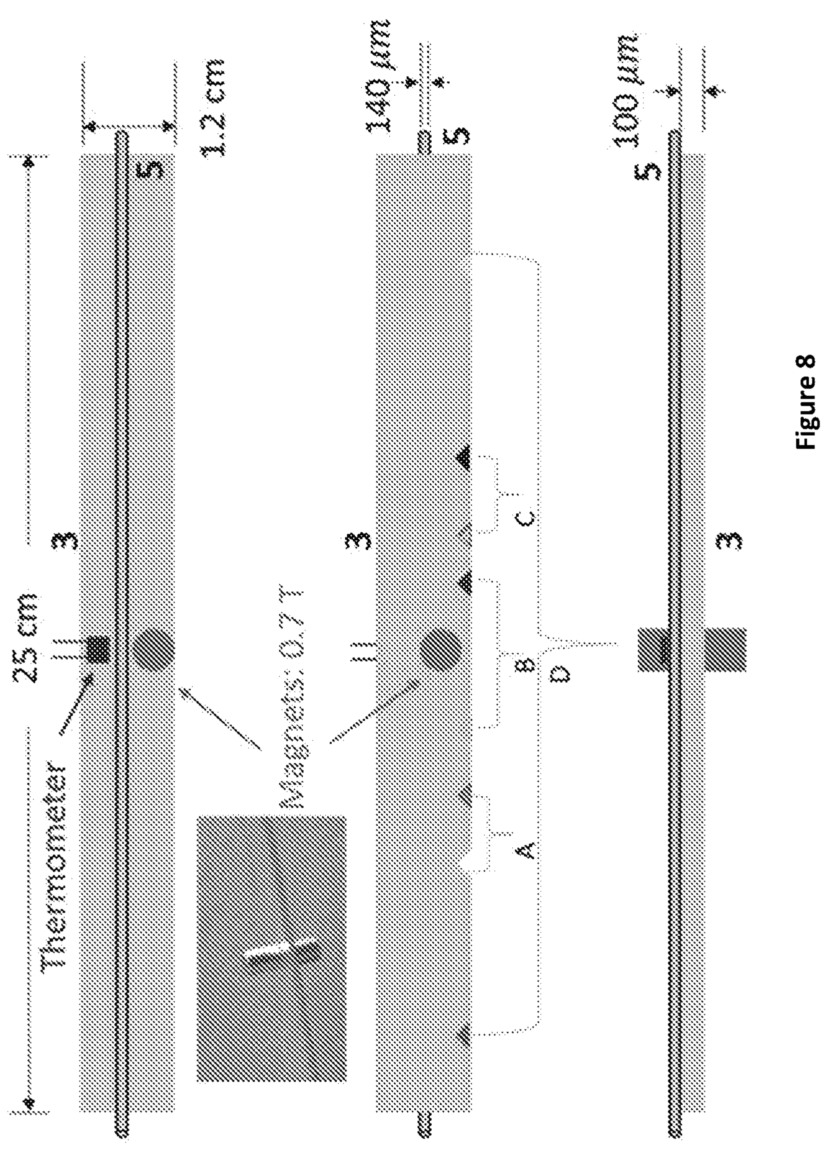

The Inventors have investigated the hotspot monitoring system 1 of the present disclosure in an experimental scheme or setup as shown in FIGS. 8, 10A and 10B. The superconductor tape 3 had a magnet placed at the centre to induce a hotspot. With a strong magnetic field, it is easier to make the superconductor 3 quench at lower currents than critical current value. A voltage measurement taps were placed around the magnet (segment B), next to the magnet (segment A and C) and along the full length (segment D). With these measurement taps one can measure the voltage in the superconductor 3 at the hotspot and around the hotspot to determine if the quench propagates to neighbouring segments leading to more hotspots. The Inventors also monitored the full length of the tape 3 for other hotspots.

The optical fiber signal IS is measured and thermometers were included next to the magnet just to observe whether the thermometers detect a temperature rise during the quench.

FIGS. 10A and 10B are images of one experiment setup showing the optical fiber 5 glued to the superconductor 3 by means of a high thermal conductivity glue. The magnet, thermometers and the voltage measurement taps placed around it are also visible in the images. The reference fiber 7, laser source 11 and detector 15 are not included in the photograph.

FIGS. 11A to 11E show measured results. During the experiment, the Inventors pulsed increasingly high currents in the superconductor 3 and observed the quench and the optical fiber output IS. What is shown in FIGS. 11A to 11E is the current pulsed through the superconductor sample 3, the voltage in segment B around the magnet and the optical fiber signal IS. A voltage in the hotspot regime is zero means the sample 3 is still superconducting. In the instance of a quench, the superconductor will become resistive and one observes a non-zero voltage.

In FIG. 11A, there is no quench, a zero voltage and one sees that the optical fiber signal IS shows no oscillations or signature SN but only random noise, signifying no quench.

The lower section of FIG. 11A shows a frequency analysis of the signal IS which is another way to interpret the measured results. Rather than observing the oscillations in the signal IS, one can monitor the frequency of the optical fiber signal IS whereby a non-zero frequency for a given or noticeable time interval would mean periodic oscillations are present and hence a quench. FIG. 11A shows that a non-zero frequency is not observed meaning there is no quench.

Figure 11B:
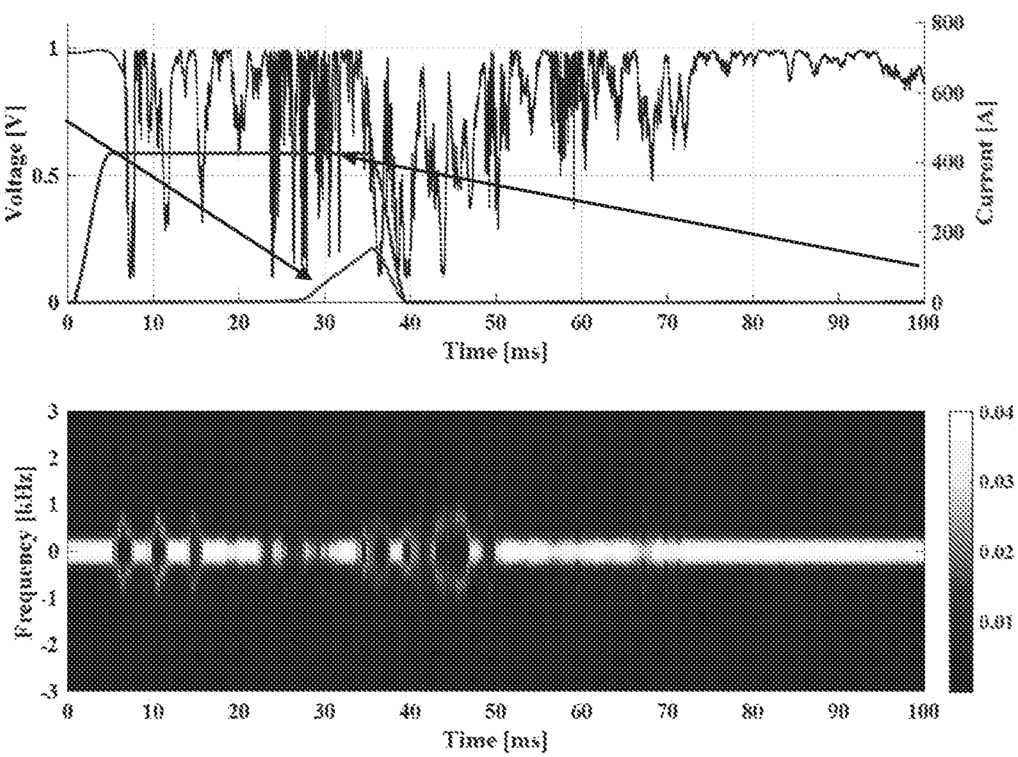

FIG. 11B shows possibly a slight quench, however, it is too small in magnitude and duration to cause heating and thereafter oscillations in the optical fiber output IS.

Figure 11C:
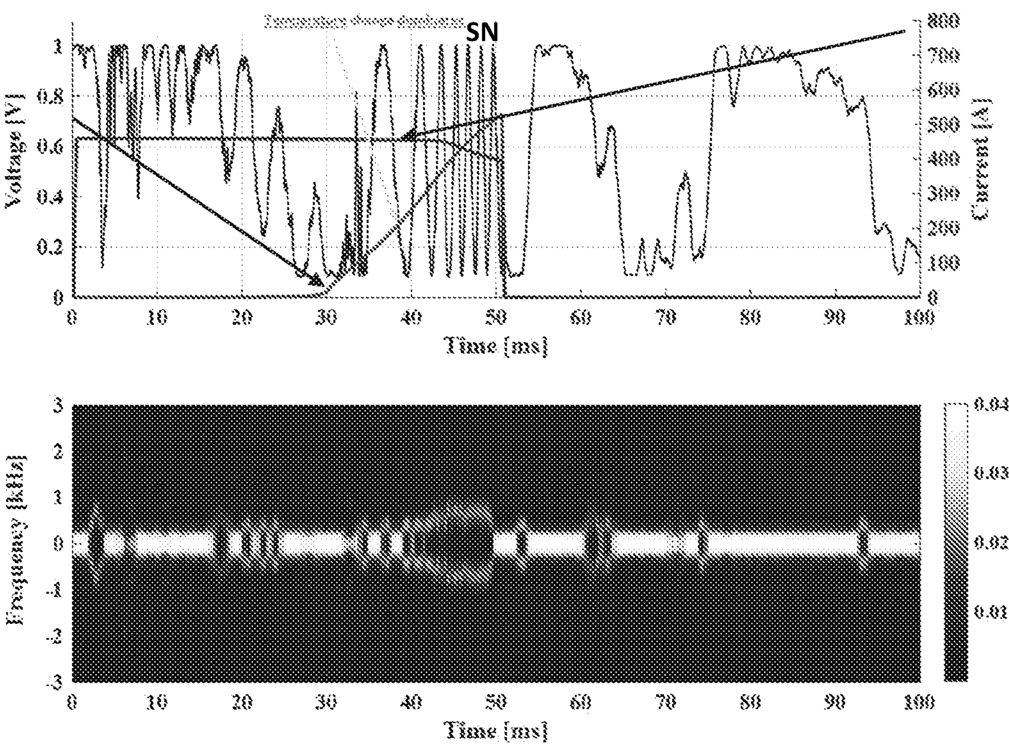

FIG. 11C shows a quench causing sufficient heating that leads to clear oscillations in the optical fiber signal IS. One also sees that as soon the voltage in the superconductor 3 starts to rise (start of the quench) the optical fiber signal IS shows clear oscillations within 10 ms. In the frequency analysis, one sees a non-zero frequency band for a longer time compared to other smaller windows caused due to noise, thus signifying a quench.

Figures 11D, 11E:
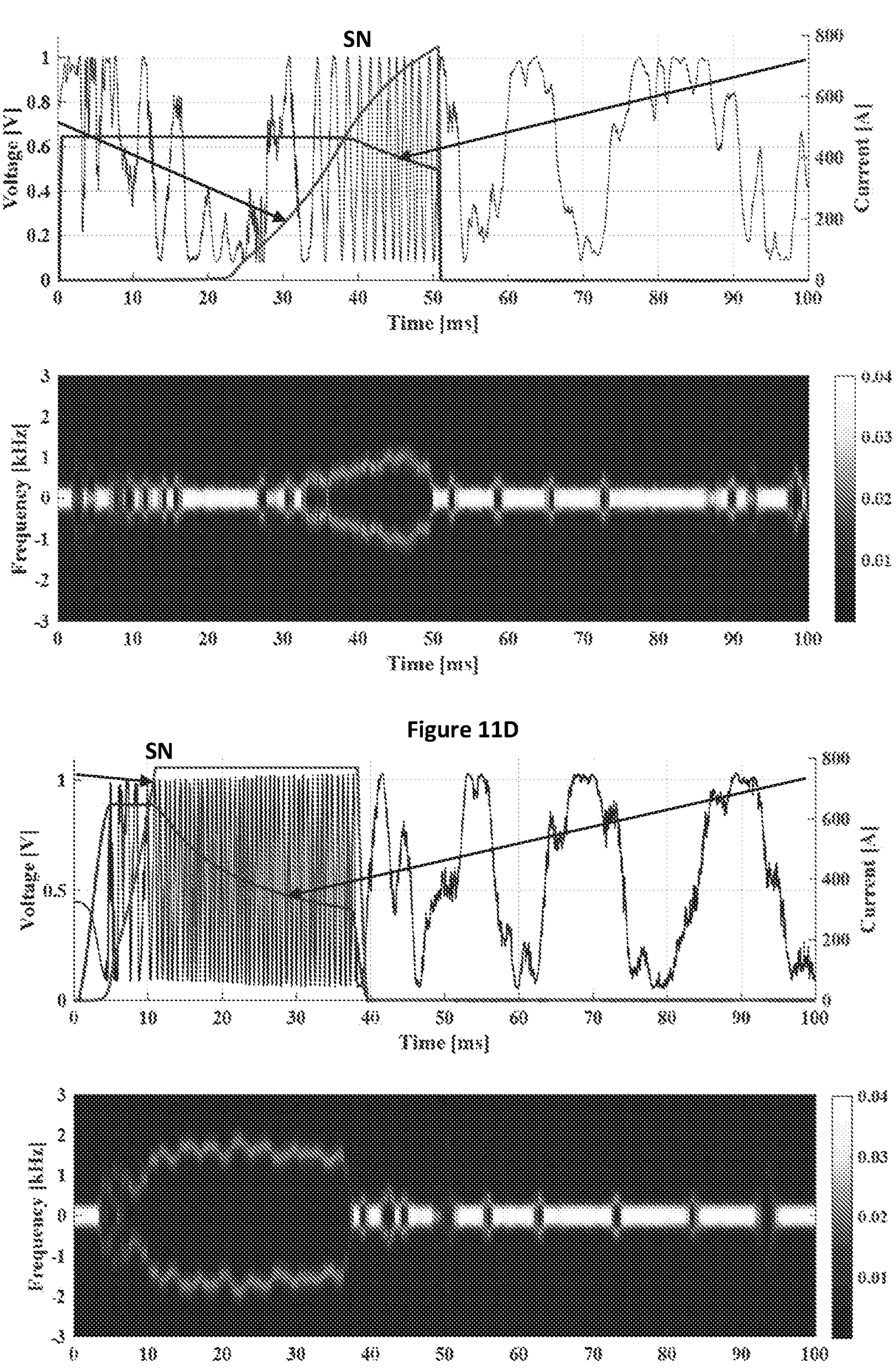

FIG. 11D shows that upon increasing the current pulsed in the sample 3, one observes increasing quench magnitude and duration and one sees higher frequency oscillations in the optical fiber signal IS also clearly visible in the frequency analysis.

FIG. 11E shows a situation above the critical current band, with a clear fault in the superconductor 3. One observes high frequency oscillations clearly visible soon after the quench showing the fast response of the hotspot monitoring system 1 of the present disclosure. The frequency analysis also shows a high non-zero frequency for the duration of the quench.

These results show that hotspots can be detected within 10 ms of heating or structural changes in the superconductor 3 with the significant benefit that one can now efficiently monitor and protect the superconductor device 1 or a SFCL device. Consequently, for example, one does not need to open a DC breaker every time the current increases beyond a threshold, rather one can monitor the temperature or structural changes along the superconductor 3 and raise the alarm when really necessary.

Our technique of the present disclosure is extremely sensitive and capable of detecting even singular points of heating in the superconductor. The optical fiber output IS shows clear oscillations SN as soon as one sees a quench. Even though the optical fiber output IS shows noise due to disturbances like vibrations, liquid nitrogen bubbling etc, the temperature change or structural change clearly dominates, and one observes a clear signature SN or periodic oscillations identifying the presence of a hotspot.

As previously mentioned, to protect for example a SFCL device, a decision needs to be taken within 10-30 ms as a much slower response, which is beyond this safety timeframe after which if you sense the hotspot, is too late and the superconductor 3 and device, for example, the SFCL device is damaged. The present technique allows to raise an alarm very quickly, within for example 10 ms, using a more cost-efficient approach and simpler configuration.

FIG. 9 shows a further experimental setup used by the Inventors to demonstrate the benefits of the hotspot monitoring system 1 of the present disclosure. In the setup of FIG. 9, an exemplary Mach-Zehnder Interferometer (MZI) configuration is used. Light from a narrow-linewidth laser is split into two branches: the upper one is integrated with the SFCL and serves as the signal branch, while the lower one acts as the reference branch. A device to adjust the polarization is present on the reference arm and under optimum conditions the light polarizations in both branches are well aligned at the coupler.

The experiment schematic of FIG. 9 comprises an optical fiber integrated along the length of a 30 cm long superconductor 3 by means of a coupling device consisting of STYCAST®. The optical fiber 5 is strongly coupled to the superconductor 3 to secure a good mechanical and thermal response.

A 10 mm diameter, ~700 mT magnet is placed at the center of the sample 3 to create a weak point, where the local critical current is significantly decreased. A PT1000 temperature sensor is placed on the conductor 3, in close proximity to the magnet. Like before, voltage taps are added along the length of the superconductor tape 3 for measuring the voltage in the hotspot regime and also in the adjacent segments to study the propagation of the transition. The sample 3 is cooled to 77 K or may be further cooled to 67 K. Current is applied to the sample 3 by means of a DC current pulser. Current through the sample 3 and voltages around the weak point as well as along the sample length are measured. The MZI output IS and the PT1000 temperature are also acquired.

The schematic of FIG. 7A shows the tape architecture 3 used in these experiments. This structure 3 does not include a thermal stabilizer 33, however, the experiment has also been conducted on the FastGrid conductors 3 thermally stabilized by the addition of 500 μm Hastelloy.

FIGS. 12A to 12C show measured results.

In this experiment 170 A is applied to the sample 3 as shown in FIG. 12A. The voltage around the weak point, $v_{3-4}$, (voltage between contact 3-4 shown in FIG. 9) remains zero, signifying there is no hotspot in the sample 3. This is confirmed by the PT1000 temperature measurement which shows no temperature change. The interference pattern (or signal) IS observed in the MZI output shows fluctuations, attributed to variations in environmental factors like slowly varying temperature gradient along optical fibre path. These fluctuations in the optical fibre response follow no clear pattern which is an indicator of no hotspot in the superconductor 3.

450 A was applied to the sample for 50 ms, as shown in FIG. 12B. This figure also shows the temperature curve measured by the PT1000, with the maximum temperature change ≈7 K. The oscillatory response of the interferometer output IS can be seen to vary in frequency according to the temperature change in FIG. 12B.

FIG. 12C shows an enlarged view of FIG. 12B for the duration of the current pulse. It shows that the voltage around the hotspot, $v_{3-4}$, reaches 0.8 V while in the adjacent segments ($v_{1-2}$) and ($v_{5-6}$) it remains zero. These zero voltages in adjacent segments signifies the presence of a single point of heating in the sample 3. Before the voltage begins to rise around the hotspot, the the interferometer output IS response shows no clear pattern which can be observed in FIG. 12C up to 30 ms after the pulse. In the presence of a hotspot, the interferometer output IS response shows a rapid transition to an oscillatory response of the form cos ($\Delta\phi_H$) as explained in the analysis above. The interferometer output IS response is rapid and oscillations are observed as soon as voltage around the weak point begins to rise.

Interestingly, the thermometer begins to show a temperature increase 20 ms after the oscillatory response is observed in the interferometer output IS. This delay in the thermometer response as compared to the interferometer output IS response may be understood by the fact that thermal transfer is slower than strain transfer to the optical fibre 5. The technique therefore is sensitive to both temperature and strain which highlights the sensitivity to the device or system setup to achieve a more rapid response to hotspots.

In the experiment results in FIG. 12A to 12C, it is demonstrated that the hotspot monitoring system 1 of the present disclosure is capable of detecting a singular hotspot immediately. In this experiment, it has been observed that the setup sensitivity is not constant and varies depending on multiple factors like the quality of the optical fibre integration, liquid nitrogen bath temperature and sample type. FIGS. 13A to 13B show measurements investigating how the sensitivity and response time depends on the kind of coupling present between the optical fibre 5 and the conductor 3. A comparison of the response of the technique in two experiments identified as Exp 1 and Exp 2 (see Table 1 below), for a 10 K temperature change measured by the PT1000, are shown in FIGS. 13A and 13B, respectively.

TABLE 1

Experiment summary

| Experiment | Optical fibre coupling | Response |
|---|---|---|
| Exp 1. | Thermal only | Temperature sensitive (Low sensitivity, slow) |
| Exp 2. | Strong mechanical and thermal | Strain dominated (High sensitivity, fast) |

Table 1 characterizes the two experimental setups that varied in terms of optical fibre coupling to the sample. From FIG. 13A, it can be observed that Exp 1 shows a weak, low frequency response to the hotspot. Due to impeded strain transfer to the optical fibre 5, the response in Exp 1 is mainly due to a slow thermal transfer to the optical fibre 5. However, for the same temperature change a much stronger response is observed for Exp 2, as shown in FIG. 13B where the optical fibre 5 response precedes the PT1000 temperature increase by 20 ms. This signifies that the response is due to thermally induced strain in the sample 3, which can be observed before a temperature change is observed by the thermometer.

Experimental results demonstrate that, proper mechanical coupling between the optical fibre 5 and the superconductor 3 can enhance the sensitivity of the setup to thermally-induced strains, leading not only to a more instantaneous strain-dominated response but also enabling lower temperature hotspot detection, as summarized in FIG. 14. This mechanical coupling comprises or consists of a rigid coupling, for example, assured by rigid media. In contrast, for thermal coupling comprising or consisting of a mechanically soft coupling is used, for example, the media used for integration remains soft or non-rigid and conducts heat.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments and be given the broadest reasonable interpretation in accordance with the language of the appended claims. Features of one of the above described embodiments may be included in any other embodiment described herein.

REFERENCES

[1] S. Debnath and M. Chinthavali, "Control of MMC-HVDC in low inertia weak grids," 2017 IEEE 12th International Conference on Power Electronics and Drive Systems (PEDS), Honolulu, HI, 2017, pp. 435-441.

[2] E. Spahic, D. Ergin, F. Schettler and J. Dorn, HVDC protection. A closer look at protection concepts for DC systems, CIGRE 2016, paper B4-118.

[3] W. Leon, P. Tixador, B. Raison, A. Bertinado and C. Creusot, Technical and economic analysis of the R-Type SFCL for HVDC grids protection, IEEE Trans. Appl. Supercond., Vol. 27, 1-9.

[4] F. A. Mourinho, D. Motter, J. C. M. Vieira, R. M. Monaro, S. P. L. Blond, M. Zhang, and W. Yuan, "Modeling and analysis of superconducting fault current limiters applied in vsc-hvdc systems", Power Energy Society General Meeting, 2015 IEEE, July 2015, pp. 1-5.

[5] M. Noe, A. Hobl, P. Tixador, L. Martini, B. Dutoit, "Conceptual Design of a 24 kV, 1 kA Resistive Superconducting Fault Current Limiter", IEEE Trans. on Applied Supercond., vol. 22, 2012, Art. no 5600304.

[6] P. Tixador; M. Bauer; C. Bruzek; A. Calleja; G. Deutscher; B. Dutoit; F. Gonnory; L. Martini; M. Noe; X. Obradors; M. Pekarakova; F. Sirois, Status of the European Union Project FASTGRID, IEEE Transactions on Applied Superconductivity, Volume: 29, Issue: 5

[7] Lacroix C, Fournier-Lupien J-H, McMeekin K and Sirois F 2013 IEEE Trans. Appl. Supercond. 23 4701605

[8] J Schwartz, F Scurti, S Rogers, W K Chan, Self-monitoring superconducting tape via integrated optical fibres, US Patent 20170179364A1, 2016

[9] International Patent Application n° PCT/IB2019/057271 filed Aug. 29, 2019

[10] Kersey A, Davis M, Patrick H, LeBlanc M, Koo K, Askins C, Putnam M, Friebele E, Fibre grating Sensors, Journal of lightwave technology, vol. 15, no. 8, August 1997

[11] Scurti F, McGarrahan J and Schwartz J 2017 Effects of metallic coatings on the thermal sensitivity of optical fibre sensors at cryogenic temperatures Opt. Mater. Express 7 1754-66

[12] Chiuchiolo, Antonella & Bajko, Marta & Perez, J. & Bajas, H. & Consales, M. & Giordano, Michele & Breglio, Giovanni & Cusano, A. (2014). Fibre Bragg Grating Cryosensors for Superconducting Accelerator Magnets. IEEE Photonics Journal. 6. 1-10. 10.1109/JPHOT.2014.2343994.

[13] R. Rajini-Kumar, M. Suesser, K. G. Narayankhedkar, G. Krieg, and M. D. Atrey, "Performance evaluation of metal coated fibre Bragg grating sensors for sensing cryogenic temperature," Cryogenics, vol. 48, no. 3/4, pp. 142-147, March/April 2008

The invention claimed is:

1. Hotspot monitoring system including:

a superconductor;

a first optical waveguide attached to the superconductor for providing a first optical signal;

a second optical waveguide for providing a reference signal; and interference means configured to overlay or superimpose the first optical signal and the reference optical signal to produce an optical interference signal;

wherein the first optical waveguide is attached to the superconductor to generate an optical path change for light propagating in the first optical waveguide to produce a change in the optical interference signal produced by the optical interference of the first optical signal and the reference optical signal, the optical path change in the first optical waveguide being generated when the superconductor transitions to a resistive state from a superconducting state.

2. Hotspot monitoring system according to claim 1, wherein the second optical waveguide is non-attached to the superconductor.

3. Hotspot monitoring system according to claim 1, wherein the first optical waveguide is directly or indirectly attached to the superconductor.

4. Hotspot monitoring system according to claim 3, wherein the first optical waveguide is attached to a surface of the superconductor, or embedded in the superconductor.

5. Hotspot monitoring system according to claim 3, wherein the first optical waveguide is attached to the superconductor along a length of the superconductor.

6. Hotspot monitoring system according to claim 1, further including a coupling device configured to mechanically and/or thermally couple the first optical waveguide to the superconductor.

7. Hotspot monitoring system according to claim 6, wherein the coupling device partially or fully encloses or encapsulates the first optical waveguide.

8. Hotspot monitoring system according to claim 7, wherein the coupling device is configured to mechanically couple the first optical waveguide to a structural strain generated by hotspot thermal heating in a substrate of the superconductor.

9. Hotspot monitoring system according to claim 8, wherein the coupling device comprises or consists of an adhesive, epoxy or glue.

10. Hotspot monitoring system according to claim 1, wherein the first optical waveguide, the second optical waveguide and the interference means are arranged to determine a relative phase-shift variation between the first optical signal and the reference optical signal via the optical interference signal produced by the first optical signal and the reference optical signal.

11. Hotspot monitoring system according to claim 1, wherein the first optical waveguide, the second optical waveguide and the interference means are arranged to implement a Mach-Zehnder interferometer to produce the optical interference signal.

12. Hotspot monitoring system according to claim 1, wherein the first optical waveguide and/or the second optical waveguide includes an outer protection layer.

13. Hotspot monitoring system according to claim 12, wherein the first optical waveguide comprises a first optical fiber comprising glass and/or silica, and/or the second optical waveguide comprises a second optical fiber comprising glass and/or silica.

14. Hotspot monitoring system according to claim 1, further including a light splitter configured to receive an input electromagnetic wave and to split the input electromagnetic wave into (i) at least a first input optical signal and provide the first input optical signal to the first optical waveguide and (ii) at least a second input optical signal and provide the second input optical signal to the second optical waveguide.

15. Hotspot monitoring system according to claim 1, further including a processing device configured to receive the optical interference signal from the optical sensor and configured to determine the presence of a single or at least one hotspot or heating point in the superconductor from a signature present in the optical interference signal.

16. Hotspot monitoring system according to claim 15, wherein the signature comprises or consists of a pre-defined phase-shift change or amplitude oscillation in the optical interference signal.

17. Hotspot monitoring system according to claim 16, wherein the pre-defined phase-shift change comprises or consists of a change or rapid change in phase shift from 0 to $2\pi$.

18. Hotspot monitoring system according to claim 15, wherein the processing device includes (i) a processor and (ii) a memory containing processor executable instructions to carry out a determination of the presence of the signature.

19. Grid or power transmission network including at least one or a plurality of hotspot monitoring systems according to claim 1.

20. Method for determining a presence of a single or at least one hotspot or heating point in a superconductor, the method including the steps of:

providing a hotspot monitoring system according to claim 1;

determining the presence of a single or at least one hotspot or heating point in the superconductor from a signature present in the optical interference signal.

* * * * *